(12) United States Patent
Wakely et al.

(10) Patent No.: US 8,533,027 B1
(45) Date of Patent: Sep. 10, 2013

(54) USER INTERFACE ENABLING APPROVAL/DISAPPOVAL OF REVISED CONTRACT PERFORMANCE INDICATORS

(75) Inventors: Paul Wakely, Dunrobin (CA); Andrea Curtis, Ottawa (CA); Stephan Doucet, Ottawa (CA); Karen Robb, Ottawa (CA)

(73) Assignee: Hewlett-Packard Development Company, L.P., Houston, TX (US)

( * ) Notice: Subject to any disclaimer, the term of this patent is extended or adjusted under 35 U.S.C. 154(b) by 2187 days.

(21) Appl. No.: 10/902,256

(22) Filed: Jul. 30, 2004

(51) Int. Cl.
*G06Q 10/00* (2012.01)

(52) U.S. Cl.
USPC ........ 705/7.39; 705/7.28; 705/7.36; 705/7.38

(58) Field of Classification Search
USPC .............................. 705/7.39, 7.28, 7.36, 7.38
See application file for complete search history.

(56) References Cited

U.S. PATENT DOCUMENTS

| | | | |
|---|---|---|---|
| 5,765,138 A * | 6/1998 | Aycock et al. ..................... | 705/7 |
| 6,236,984 B1 | 5/2001 | Owens et al. | |
| 6,338,071 B1 | 1/2002 | Balaban et al. | |
| 6,578,004 B1 * | 6/2003 | Cimral et al. ..................... | 705/7 |
| 7,016,859 B2 * | 3/2006 | Whitesage ........................ | 705/8 |
| 7,317,533 B2 * | 1/2008 | Chiarello et al. .............. | 356/445 |
| 7,693,738 B2 * | 4/2010 | Guinta et al. ................. | 705/7.32 |
| 7,792,694 B2 * | 9/2010 | Jamil et al. ................... | 705/7.28 |
| 7,865,382 B2 * | 1/2011 | Menon et al. ................. | 705/7.22 |
| 2002/0087705 A1 * | 7/2002 | Smyth ........................... | 709/229 |
| 2002/0184043 A1 * | 12/2002 | Lavorgna et al. ................. | 705/1 |
| 2002/0194008 A1 * | 12/2002 | Yang et al. ........................ | 705/1 |
| 2003/0033187 A1 * | 2/2003 | Jones et al. ........................ | 705/9 |
| 2003/0050804 A1 * | 3/2003 | Hendershot ....................... | 705/4 |
| 2003/0055660 A1 * | 3/2003 | Gusler et al. ..................... | 705/1 |
| 2003/0068993 A1 * | 4/2003 | Miya .......................... | 455/276.1 |
| 2003/0083897 A1 | 5/2003 | Baldwin et al. | |
| 2003/0125965 A1 * | 7/2003 | Falso et al. ....................... | 705/1 |
| 2003/0126003 A1 * | 7/2003 | vom Scheidt et al. ............ | 705/8 |
| 2003/0135481 A1 * | 7/2003 | Helmes et al. .................... | 707/1 |
| 2004/0032420 A1 * | 2/2004 | Allen et al. .................... | 345/700 |
| 2004/0039650 A1 * | 2/2004 | Lentz .............................. | 705/26 |
| 2004/0083119 A1 | 4/2004 | Schunder et al. | |
| 2004/0085355 A1 | 5/2004 | Harmes et al. | |
| 2004/0122936 A1 * | 6/2004 | Mizelle et al. ................ | 709/224 |
| 2004/0193643 A1 * | 9/2004 | O'Brien et al. ............ | 707/104.1 |
| 2005/0144592 A1 * | 6/2005 | Below et al. .................. | 717/124 |
| 2005/0154769 A1 * | 7/2005 | Eckart et al. .................. | 707/201 |

FOREIGN PATENT DOCUMENTS

WO    WO 02/102097 A1 *   12/2002

OTHER PUBLICATIONS

Ergometrics.com Web Pages Mar. 2000, Retreived from Archive.org Jan. 25, 2007.*
I-many Announces Sarbanes-Oxley Suite Business Wire, Jun. 11, 2003.*
Primavera Expedition—Contract Control Software—Version 6.0 User's Guide Primavera Systems, 1998.*

(Continued)

*Primary Examiner* — Scott L Jarret

(57) ABSTRACT

A user interface and processes are provided to monitor contracts for the delivery of products and/or services to different customers. The user interface provides a comprehensive visual display such that a user can view multiple contracts and a variety of performance information for each contract. The user interface also enables a user to update performance indicators for a contract and to identify contracts that require heightened scrutiny or action to mitigate current problems or potential issues.

22 Claims, 13 Drawing Sheets

(56) References Cited

OTHER PUBLICATIONS

Ghoniem, Elizabeth, Taking a Step Further in Contract Management Software Contract Management, Oct. 2002.*
Upsidesoft.com Web Pages Upside Software, Apr. 2003, Retrieved from Archive.org Oct. 20, 2008.*
Compliance Financial Executive, vol. 19, No. 3, Sep. 2003.*
I-man Announces Sarbanes-Oxley Suite Buesiness Wire, Jun. 11, 2003.*
CorVu Web Pages Corvue.com, Jun. 2000, Retrieved from Archive.org Jan. 25, 2007.*
iDashes.net Web Pages iDashes.net, May 2001, Retrieved from Archive.org Jan. 25, 2007.*
Chang, Richard et al, Performance Scorecards Josey-Bass, Inc., 2000, ISBN: 0-7879-52772-9.*
Epstein, Marc et al, Implementing Corporate Strategy European Management Journal, vol. 16, No. 2, Apr. 1998.*
Oracle Internal Controls Manager 11i—data sheet Oracle Corporation, 2002.*
Arnold, Tom, Dashboard & Scorecard Software: Tools for Operations Management and Strategy Deployment The Newspaper System Gorup, Sep. 18, 2002.*
EDS and CorVu Offer Visual Scorecards to Help Companies Monitor Business Performance PR Newswire, Jul. 10, 2001.*
"Products, Why Contact Management"; http://www.dicarta.com/html/products/whycontact.cfm; 1 page, Jun. 14, 2004.
Products, Key Benefits of the diCarta Contracts Solution; http://www.dicarta.com/html/products/keybenefits.cfm; pp. 1-2; Jun. 14, 2004.
"Products, The diCarta Contracts Solution"; http://www.dicarta.com/html/products/diCartacontracts.cfm; pp. 1-3; Jun. 14, 2004.
"Products, Achieving Compliance"; http://www.dicarta.com/html/products/achievingcompliance.cfm, pp. 1-3; Jun. 14, 2004.
Products, The diCarta Contracts Integration Server; http://www.dicarta.com/html/products/erp.cfm; pp. 1-2; Jun. 14, 2004
"Sarbanes-Oxley, diCarta Contracts: A Solid Foundation for Sarbanes-Oxley Compliance"; http://www.dicarta.com/html/products/sarbanes.cfm; pp. 1-2; Jun. 14, 2004.
"Healthcare"; http://www.dicarta.com/html/products/healthcare.cfm; 1 page; Jun. 14, 2004.
"Products, UpsideContract"; http://www.upsidesoft.com/Upside+Software/Products/UpsideContract.htm; pp. 1-2; Jun. 15, 2004.
"Products, Version 4 Overview, UpsideContract 4.0 is here!"; http://www.upsidesoft.com/Upside+Software/Products/Version4..htm; pp. 1-2; Jun. 15, 2004.
"Products, UpsideContract, Features"; http://www.upsidesoft.com/Upside+Software/Products/UpsideContract-Features.htm; pp. 1-24; Jun. 15, 2004.

* cited by examiner

300C

OVERALL RISK ← 322

PLEASE SELECT FROM OF THE FOLLOWING: ← 324

○ The level of risk on the contract is low and an appropriate risk management plan is in place to minimize the consequences of adverse events. } 326A ○ The level of risk on the contract is medium but a risk management plan is in place to minimize the consequences of adverse events. } 326B ● The level of risk on the contract is high. } 326E ○ A risk management plan is not in place. } 326F

↑
328

330

GREEN
330A

330B
YELLOW

330C
RED

330D
RED

FIG. 3C

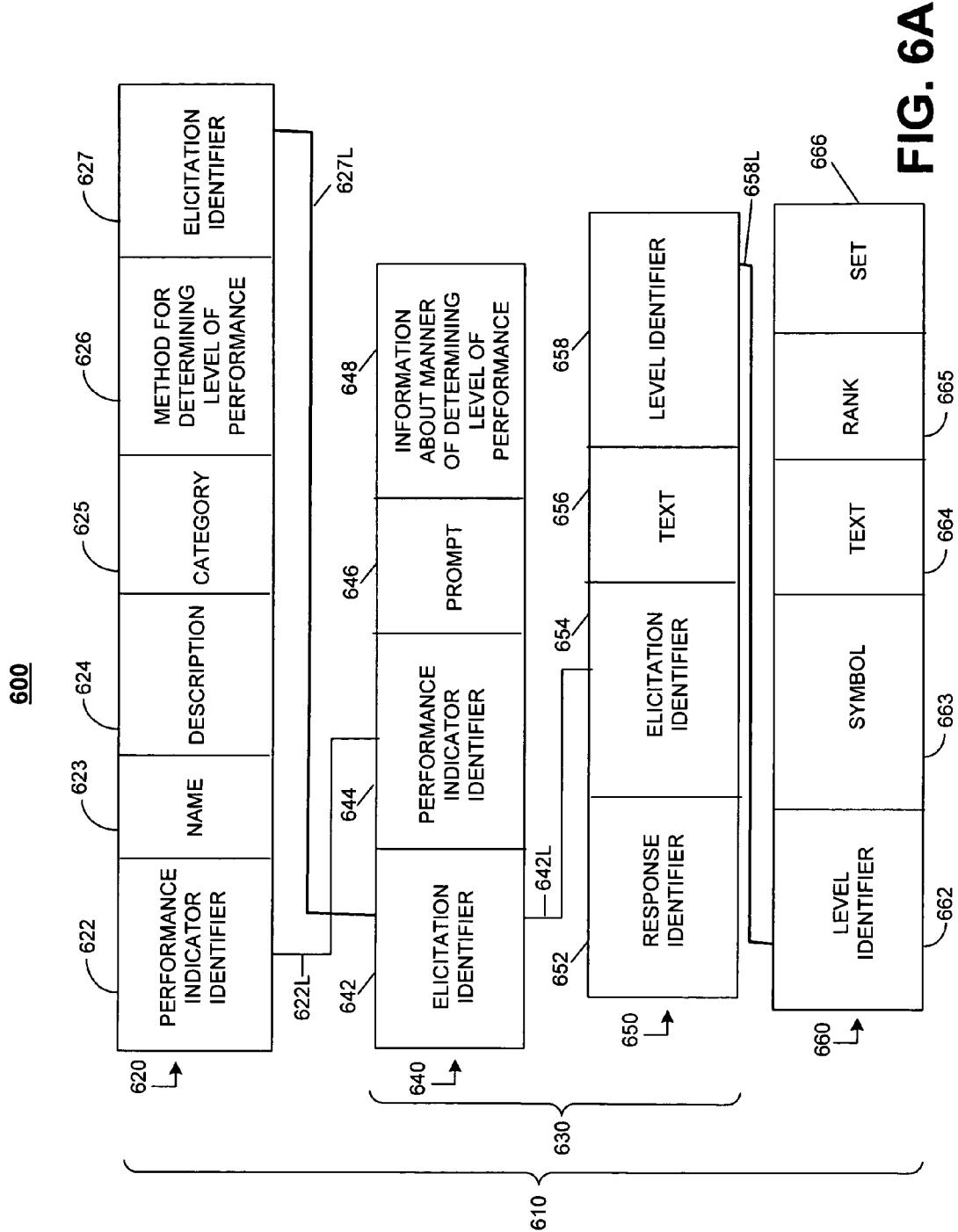

USER INTERFACE ENABLING APPROVAL/DISAPPOVAL OF REVISED CONTRACT PERFORMANCE INDICATORS

TECHNICAL FIELD

This description relates to using a computer system to monitor contract performance.

BACKGROUND

An enterprise may be obligated by contracts to provide products and/or services to customers of the enterprise. For example, a variety of information technology (IT) services may be provided to customers. Services may include customized software development, establishing and managing a computer center, providing information technology support to another enterprise, operating a help desk or call-in center, and providing systems administration or network engineering support.

Computer systems can be used to create a contract and monitor contract compliance. Contract compliance monitoring may include, for example, monitoring actual financial results against budgets and forecasts, supplier management, deliverable tracking, financial processing of invoices and payments, and event or milestone monitoring. Contract compliance monitoring also may include monitoring client satisfaction, resource performance, scope changes, and risk.

SUMMARY

Generally, a user interface and processes are provided to monitor contracts for the delivery of products and/or services to different customers (who also may be referred to clients or recipients). The user interface provides a comprehensive visual display such that a user can view multiple contracts and a variety of performance information for each contract. The user interface also enables a user to update performance indicators for a contract and to identify contracts that require heightened scrutiny or action to mitigate current problems or potential issues.

One area where the tool for contract performance monitoring may find specific applicability is in monitoring contract delivery for an IT services contract from the perspective of the supplier of the services. The tool may be particularly useful in a context where many contracts, such as hundreds (or even thousands) of contracts, are in place to provide services to different customers.

It may be desirable to monitor contract performance through the use of a cyclical review process that periodically reviews a variety of contract performance indicators or factors. To do so, a user interface that provides a comprehensive visual display of multiple contracts and performance indicators for each contract may be useful. For example, a periodic review process for contracts may be useful to identity potential or actual issues and to take action to mitigate an issue before the issue escalates into a contract crisis, such as when a customer threatens to cancel the contract or to take legal action. In another example, a periodic review process may be useful to identify some of the contracts for heightened scrutiny by management to help minimize potential or actual problems.

In one general aspect, a graphical user interface on a display device of a computer enables a user to use the computer to monitor contract performance. The graphical user interface includes a summary display for monitoring contract performance. The summary display includes a table that relates contracts for services to performance indicators. The table is populated with symbols that represent different levels of performance. In particular, each displayed symbol represents a level of performance for a corresponding performance indicator and a corresponding contract.

Implementations may include one or more of the following features. For example, at least one contract may provide services to a different recipient than a recipient to whom services are provided by another contract. A user may be prompted to update symbols representing levels of performance for performance indicators associated with a particular contract.

The graphical user interface may receive updated symbols entered by a first type of user (e.g., a project manger or contract manager responsible for delivery of services for a contract) where the updated symbols represent levels of performance for performance indicators associated with a particular contract and apply to a particular period of time. The graphical user interface may display the updated symbols to a second type of user (e.g., a member of contract quality review committee) only after receiving an approval indication that is associated with the updated symbols and is entered by a third type of user (e.g., an account manager responsible for multiple contracts for a particular customer) and may display the updated symbols to the first type of user and the third type of user without an approval indication. The graphical user interface may receive the approval indication from the third type of user. The graphical user interface may display to the third type of user symbols representing levels of performance for performance indicators associated with the particular contract and that apply to a second period of time that occurs before the period of time that applies to the updated symbols when the approval indication has not been received.

The graphical user interface may display a performance-level elicitation that includes a statement and multiple responses selectable by a user and associated with a performance indicator. The graphical user interface may receive one of the multiple responses selected by the user and associated with a particular contract and may determine a level of performance for the performance indicator based on the received response. The graphical user interface also may associate the level of performance with the performance indicator for the particular contract and may display a symbol associated with the level of performance for the performance indicator when symbols for the particular contract are displayed.

The summary display may include one or more performance indicators of various kinds, including financial indicators that relate to financial performance of a contract, risk indicators that relate to identification of a potential contract issue, quality indicators that relate to quality of service provided to the recipient of the contract, resource indicators that relate to resources needed to provide services to the contract recipient, and scope indicators that indicate the extent of non-contractual services provided to the recipient of the contract. The summary display also may include information indicating an action item to be performed to improve contract performance for an associated contract.

The graphical user interface may include a selection window having selection criteria modifiable by a user and operable to determine contracts displayed in the summary display. The graphical user interface also may include a contract display including a contract description and performance information for a particular contract. The contract display may include performance information for a particular performance period for a particular contract or performance information for multiple particular performance periods for a particular contract. The contract display may include contract information related to one or more of service excellence, risk, financial performance, performance monitoring communication, and actions to mitigate risk or correct problems.

Implementations of the techniques discussed above may include a method or process, a system or apparatus, or computer software on a computer-accessible medium.

The details of one or more of the implementations are set forth in the accompanying drawings and description below. Other features will be apparent from the description and drawings, and from the claims.

DESCRIPTION OF DRAWINGS

FIGS. 3A-3G are diagrams of exemplary user interfaces for eliciting responses from a user to determine a level of performance for performance indicators.

FIGS. 6A and 6B are block diagrams illustrating an example data structure for use in monitoring performance of service contracts.

DETAILED DESCRIPTION

Figure 1A:
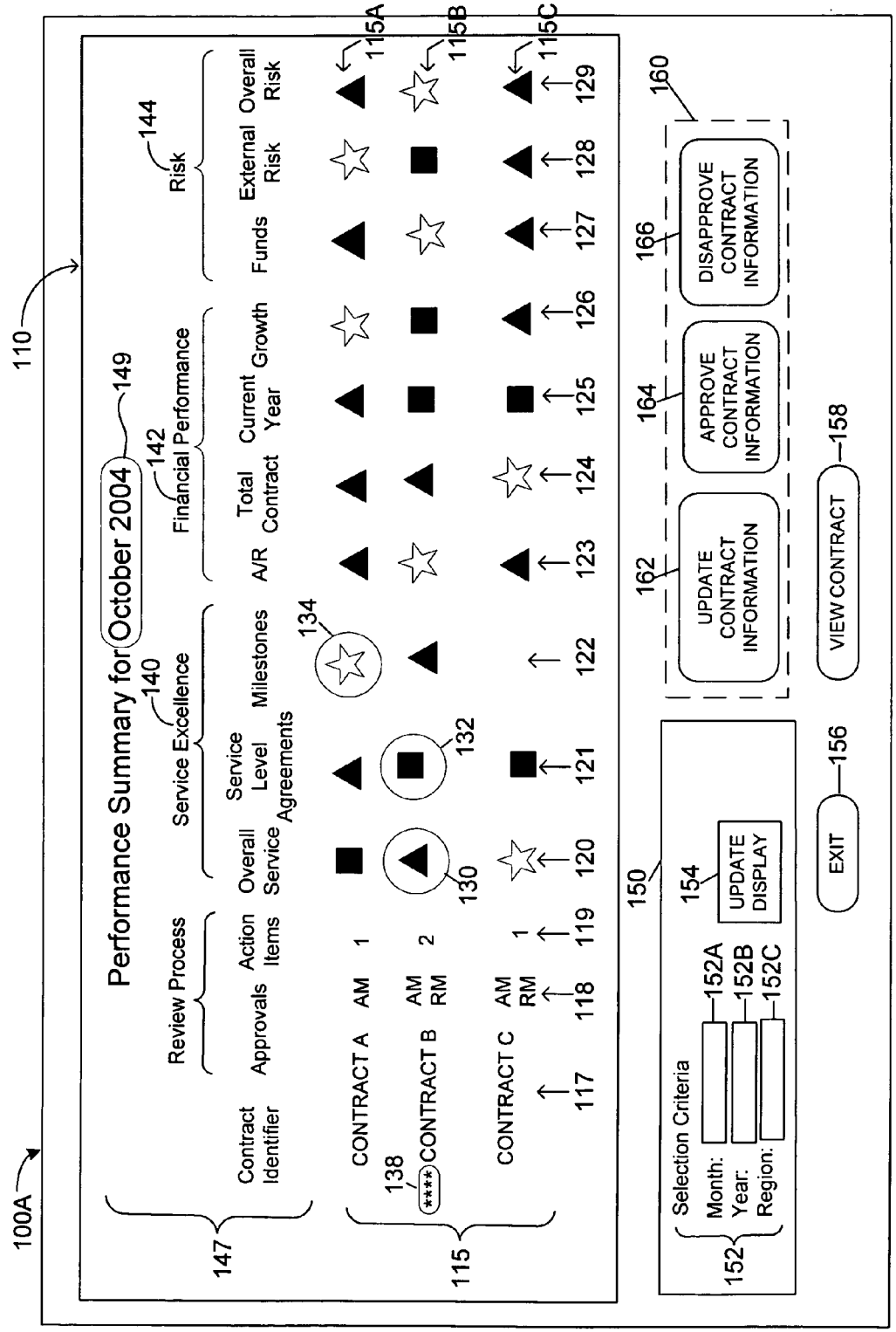
FIGS. 1A and 1B are diagrams of exemplary user interfaces that include performance information associated with one or more contracts.

FIG. 1A depicts an example of a user interface 100A that enables a user to monitor the performance of service contracts. The user interface 100A includes a performance summary window 110 that displays service contract performance information 115 about service contracts that the user is responsible for monitoring. The performance summary window 110 displays contract information 115 in a series of columns 117-129 and rows 115A-115C. Each of columns 117-129 describes an attribute of a service contract for which performance information is being displayed. Each of rows 115A-115C represents a collection of attribute values for a contract for services provided to a recipient and identified by a contract identifier in column 117. A contract identifier may be the name of the contract, a shorthand for the contract name, an abbreviation of the contract name, an identification number associated with the contract, or any identification mechanism that identifies a single contract.

The contract information window 110 also includes review process information 118 and 119. Here, the review process information includes an approvals indication 118 for each person who reviewed the current performance information for a contract. For example, the approval indicator 118 for contract 115A indicates that the contract information was approved by a user designated as "AM." Similarly, the approval indicators 118 for contracts 115B and 115C indicate that the contract information for those contracts was approved by two users "AM" and "RM." Additionally or alternatively, review process information may identify the level of authority that performed the review or merely that a review was completed. In some implementations, the review process information may be included in a window other than the performance summary window 110. The review process information also includes an action indicator 119 that indicates the number of action items that have been identified for each of contracts 115A-115C. For example, the action indicator 119 for the contract 115A indicates that one action item related to improving the performance of the contract 115A has been identified, whereas the action indicator 119 for the contract 115B indicates that two action items have been identified for the contract 115B.

The contract information 115 also includes columns 120-129, which represent performance indicators and are populated with symbols that represent different levels of performance. Each of the performance indicators 120-129 is associated with a category that descriptively associates a group of performance indicators.

A service excellence category 140 associates the performance indicators 120-122. The performance indicator 120 represents overall service performance and indicates how well the supplier is delivering service on a contract according to the opinion of the recipient of the contracted services (i.e., the customer). The performance indicator 121 represents performance related to service level agreements, that is, contractual service levels.

The performance indicator 122 represents milestone performance and indicates how well the supplier is delivering against critical dates and/or milestones of completing a particular task or delivering a particular product. The level of performance may reflect an indication of the actual completion date compared to the original baseline completion date. Some implementations may also take into account whether recovery actions were undertaken if the milestone was late. In some instances, milestones may be set by the contract or based on a supplier-scheduled milestone that is not determined by the contract.

A critical date refers to a date on which an important task on an operations-type contract must be completed. In general, a delay of the critical date may impact the supplier's ability to deliver in other areas of the contract. For example, a critical date in providing data center services for a customer may be a date by which the customer operations must be moved to the supplier's data center. The critical date needs to be met so that the customer is able to vacate the customer's data facilities by a date required by the contract.

As illustrated by the milestones performance indicator 122, a level of performance need not necessarily be assigned to each performance indicator for every contract. In other words, a performance indicator may not apply to each contract for all performance periods. In particular, contract information 115C does not include a symbol for the milestones performance indicator 122. For example, milestones and critical dates may not be able to be reported for the contract 115C because there may be no milestones or critical dates for the contract.

For brevity, the contract information 115 illustrates three performance indicators 120-122 related to service excellence 140. However, actual implementations may include additional and/or alternative performance indicators related to service excellence.

A financial performance category 142 associates performance indicators 123-126. The performance indicator 123 represents performance related to accounts receivable aging information that indicates whether the customer is current in paying for services on the contract billed to the customer and, if not, the extent to which the customer's payment is overdue. The performance indicator 124 represents a financial state related to the total contract and provides a view of the total contract's financial health. In some implementations, the total contract performance indicator 124 may be optional. The performance indicator 125 represents the financial performance for the contract and provides a view of the financial health of the contract against the projected budget for the contract at the time the contract was executed (which may be referred to as point of sale or POS), budget and based on the overall projected margin for the life of the contract, including contracts that last over more than one year. The performance indicator 126 represents financial growth and compares growth opportunities within the contract to the expectation (such as budgeted growth and projected growth) and may help to measure the current year risk of not attaining budgeted or projected growth.

For brevity, contract information 115 illustrates only four performance indicators 123-126 related to financial performance of a contract. However, actual implementations may include additional or alternative financial performance indicators. One example is a current year performance indicator that provides a view of the financial health of the contract against POS and based on the overall projected margin for the current year of the contract. Another example is a performance indicator that summarizes a profitability improvement plan that describes opportunities and risks related to financial performance of a contract.

A risk category 144 associates performance indicators 127-129, which may be referred to as risk indicators. The performance indicator 127 represents funding risk that indicates whether the contract is running low on funding and may require an amendment in the short term. The performance indicator 128 represents external risk that represents the degree of risk to which the contract is exposed due to factors that are not the responsibility of the supplier and are not part of the supplier's contractual obligations. External risks include risk factors that may threaten the success of the contract or supplier's relationship with the client, despite the fact that the supplier is not responsible. In one example, external risks may be associated with the business environment in which the supplier is working, such as when the customer experiences schedule or funding difficulties or the customer is faced with a strike by the customer's employees. The performance indicator 129 represents the overall level of risk to the contract.

For brevity, contract information 115 illustrates only three performance indicators 127-129 related to risk of a contract. However, actual implementations may include additional or alternative risk indicators, such as risk associated with one or more contingent expenses. A contingent expense is an expense that is not supported by an invoice and does not represent a service performed, or an expense that has been incurred. Another example of a risk indicator is a contract-related risk indicator that reflects risk associated with contract obligations. For example, a contract-related risk indicator may take into account whether the contract has a benchmarking clause that may allow a customer to use a third party to compare the supplier's contract pricing with market pricing; whether the contract has an audit right clause that may allow the customer or a third party to verify the supplier's compliance to the contract (such as to verify invoices and billing processes); whether a business continuity plan exists that describes procedures to allow critical business functions to continue with minimal interruption in the event of unforeseen circumstances; or whether an emergency communication plan exists that describes procedures to allow pertinent information to be communicated to employees in the event of unforeseen circumstances.

For brevity, FIG. 1A illustrates only three performance indicator categories 140, 142 and 144. However, actual implementations may include additional or alternative categories. Another example of a performance indicator category is a scope category that reflects the degree to which the contract service falls within the original scope and the degree to which scope changes are being managed with additional contract funds. The scope category may include an out-of-scope performance indicator that reflects whether work is being performed on the contract that is not covered by the contract or an approved and funded change request. The scope category also may include a performance indicator that reflects the number of proposed contract change requests that have been approved, deferred or rejected. Other examples of scope performance indicators include performance indicators reflecting the number of approved contract change requests, the number of deferred contract change requests that have been proposed but not yet approved or rejected, and the number of rejected contract change requests that were proposed and rejected by the customer or the supplier.

A performance indicator category may include a resources category that includes, for example, performance indicators related to the level of satisfaction of the customer with the resources provided by the contract, the level of satisfaction of the supplier with the resources provided, and the level of satisfaction of the customer or supplier with the resources provided. The resources category also may be referred to as a resources performance category.

Each of the displayed symbols in one of rows 115A, 115B or 115C represents a level of performance associated with the performance indicator of the corresponding column of columns 121-129 for the contract identified by the contract identifier 117 for the row 115A, 115B or 115C.

In the contract information 115, shapes are used to designate levels of performance indicators 120-129. The level of performance indicators, however, may be depicted in any number of ways, including but not limited to, shapes, colors, size of shapes, shading of shapes, numbers or text. In particular, contract information 115 includes a triangle symbol (such as symbol 130), a square symbol (such as symbol 132), and a star symbol (such as symbol 134). In one example, the star symbol may represent a level of performance that is excellent or above expectations; the triangle symbol may represent a level of performance that is acceptable, good or meets expectations; and the square symbol may represent a level of performance that is poor, below expectations or merits additional scrutiny or intervention.

The indication of the level of performance may be presented in other ways, such as by presenting color-coded text or symbols in which the color corresponds to a level of performance. For example, green text or a green symbol may represent a satisfactory level of performance, yellow text or a yellow symbol may represent a level of performance that is marginally satisfactory and bears watching, and red text or a red symbol may represent a critical level of performance in need of mitigation.

The number of levels of performance is not limited to three. For example, there may be only two levels of performance in which one of two possible levels of performance (such as, satisfactory or critical) is associated with a performance indicator. In some instances, there may be more than three levels of performance, such as 4, 5 or 7 levels.

In some implementations, different levels of performance schemes may be applied based on the performance indicator. For example, three levels of performance may apply to most performance indicators in an implementation, with a different symbol being used to represent each level. However, in the same implementation, there may be one or more performance indicators to which a two-level performance indication scheme is more applicable. Moreover, the symbols used to represent each of the two levels may be different than the three symbols used to represent the three-level performance scheme. For example, a star, a square and a triangle may be used to represent each of the levels in the three-level scheme, whereas a red circle and a green circle may be used to represent each of the levels in the two-level scheme.

In FIG. 1A, the contract information 115A includes a star symbol 134 indicating a level of performance for the milestones performance indicator 122. The contract information 115B includes a triangle symbol 130 representing a level of overall service 120 and a square representing a level of performance related to service level agreements 121.

The contract information 115 may include an indicator, such as indicator 138 for contract 115B, that identifies a contract that is in need of heightened scrutiny and/or mitigation action to reduce risk.

The performance summary window 110 also includes heading information 147 that describes portions of the contract information 115. Time period information 149 indicates the time period that applies to the performance summary shown in the contract information 115.

For brevity, FIG. 1A only shows three rows 115A, 115B and 115C of contract information. However, actual implementations may include many more rows of contract information. In addition, this information need not necessarily be displayed in rows. For example, contract information may be displayed in which each column represents a particular contract and each row represents performance indicators and other types of contract information (such as contract identifier 117 and review process indicators 118 and 119).

The user interface 100A also includes a selection window 150 for entering and using selection criteria 152 to specify the contracts that are presented in performance summary window 110. In one example, when a user enters a month in a field 152A and year in a field 152B and activates a control 154 for updating the display, contract information 115 reflecting the status for that month and year of the contracts are displayed in the performance summary window 110. The control 154 may be activated, for example, when a user presses (or clicks) a button on a pointing device, such as a mouse, while the cursor hovers over the update display control 154 on the display device.

Additionally, when a user enters a region in a field 152C and activates the update display control 154, only contract information 115 for the period identified by the entries in fields 152A and 152B from the region in the field 152C is displayed in performance summary window 110.

Some implementations may include other types of selection criteria to control the contracts for which contract information 115 is displayed in the performance summary window 110. For example, contract information 115 may be displayed based on a date range, a particular level of performance for a particular performance indicator, the number of action items associated with a contract and/or whether heightened scrutiny is indicated for a contract.

The user interface 100A also includes an exit control 156 that a user may activate to end the session of monitoring contract performance and close the display of the user interface 100A.

Figure 1B:
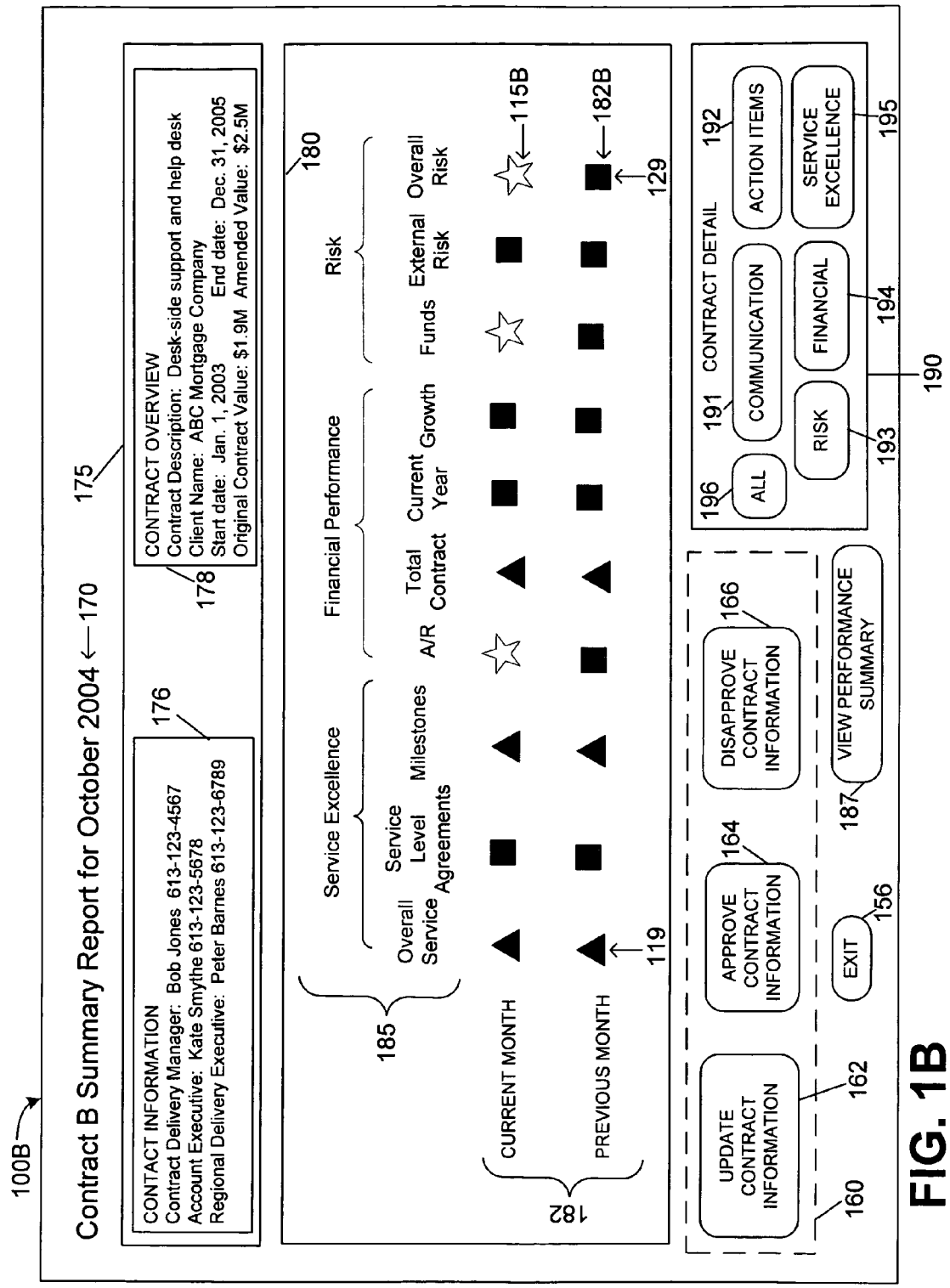

The user interface 100A also includes a control 158 for viewing more detailed performance information related to a particular contract, such as is described with respect to the user interface 100B of FIG. 1B. To do so, a user may activate control 158 after selecting one of rows 115A, 115B or 115C for which more detailed performance information is to be displayed. In some implementations, the contract identifier may be selected to display more detailed performance information for the contract and the control 158 need not necessarily be included in the user interface 100A.

The user interface 100A also includes a control window 160 having a control 162 for updating contract information. The update control 162 allows a user to enter one or more new levels of performance to replace the current levels of performance for performance indicators for a contract. This may be accomplished, for example, as described below with respect to FIG. 2.

The control window 160 also includes a control 164 for approving, and a control 166 for disapproving, the contract information 115 presented in the performance summary window 110. The approval and disapproval controls 164 and 166 allow a user to approve or disapprove, respectively, the levels of performance indicators 120-129 for one or more of the contracts 115A, 115B and 115C. In some implementations, when levels of performance are disapproved for a contract, the user who entered the levels that were disapproved is notified and asked to revise the levels of performance for the contract.

In some implementations, a user other than the user responsible for entering the levels of performance or the user responsible for reviewing the entered levels of performance is not permitted to view the entered performance levels for a contract until the levels of performance are approved. This may be useful, for example, to prevent wasted effort which may occur when a user takes action based on performance levels for a contract that are subsequently revised. In one example, actions to mitigate risk may be undertaken only after a risk indicator that indicates that a risk needs to be mitigated has been approved. Prior to the approval of the risk indicator, mitigation action would have been premature and may have resulted in wasted effort.

FIG. 1B shows an example of a user interface 100B that is displayed to enable a user to monitor the performance of a particular service contract. The user interface 100B includes a heading 170 that identifies the particular contract and the time period for which the performance information is presented. The user interface 100B also includes a contract information window 175 that provides contact information 176 that identifies people related to the contract, such as a contract delivery manager, an account executive, and a regional delivery executive, and contact information for each person. The contract information window 175 also includes a contract overview 178 that includes a contract description, client name, start date, end date, original contract value, and amended contract value.

The user interface 100B also includes a performance summary window 180 that displays contract performance information 182 for the contract. In particular, the contract performance information 182 includes levels of performance, represented by symbols, for performance indicators 119-129, as described previously with respect to FIG. 1A. The contract performance information 182 includes levels of performance for the current period 115B (i.e., the current month) and levels of performance for the previous period 182B (i.e., the previous month). The presentation of the levels of performance for the current period 115B and the previous period 182B may be useful to allow a user to compare the performance across the periods. Some implementations may show additional periods or only current period performance. The performance indicators 119-129 are the same performance indicators as shown in the performance summary window 110 for multiple contracts, though this need not necessarily be so.

The user interface 100B also includes an exit control 156 that a user may activate to end the session of monitoring contract performance and close the display of the user interface 100B.

The user interface 100B also includes a control window 160 having a control 162 for updating contract information, a control 164 for approving contract information, and a control 166 for disapproving contract information for the current period.

The user interface 100B also includes a control 187 for viewing a performance summary for multiple contracts, such as the performance summary provided by the user interface 100A of FIG. 1A.

The user interface 100B also includes a contract-detail window 190 for controlling the display of additional information related to the contract. The contract-detail window 190 includes a control 191 for displaying information related to communications that occur about contract performance. Such communication information may include, for example, information about review meetings with the delivery manager responsible for the contract (such as the review meeting date, a list of attendees and roles, and action items identified or discussed at the meeting), when an executive review is scheduled and/or last occurred, and approval status of the current performance information (such as the one or more users who approved the information, when the information was approved, and any comments by the user who approved the information).

The contract-detail window 190 also includes a control 192 for displaying a list of action items 192 associated with mitigating risk or correcting problems of the contract. The information associated with each action item may include, for example, an action item identifier to uniquely identify the action item for the contract, a person responsible for completing the action item (who may be referred to as an "owner"), the date on which the action item was identified, a due date for the action item, a status of the action item, a date on which the action item was completed, and comments related to the action item.

The contract-detail window 190 also includes a control 193 for displaying information related to risk associated with the contract. The risk information displayed may include, for example, a list of risks and a mitigation plan for each identified risk. The risk information also may include a list of risk indicators and, for each risk indicator, a description of the risk indicator, the current identified level of risk, and a description of each level of risk.

The contract-detail window 190 also includes a control 194 for displaying financial information for the contract. The financial information may include, for example, accounts receivable information (such as an amount for each of several aging periods for invoices and a total amount of accounts receivable for the contract), revenue and contribution information (such as total revenue, total cost, and a profit margin), growth revenue and contribution information (such as a projected revenue, projected cost, and a projected profit margin), and a summary of future opportunities related to the contract. The financial information also may include information for each financial performance indicator, including, for example, a description of the performance indicator, the current level of performance associated with the performance indicator, and a description of each level of performance associated with the performance indicator.

The contract-detail window 190 also includes a control 195 for displaying information related to service excellence. Such information may include, for example, results of a survey of customer satisfaction. The information about service excellence also may include information for related performance indicators, including, for example, a description of the performance indicator, the current level of performance associated with the performance indicator, and a description of each level of performance associated with the performance indicator.

The contract-detail window 190 also includes a control 196 for displaying all of the information, including communication information, action items, risk information, financial information, and information related to service excellence.

Some implementations may include the capability of printing some or all of the performance information for the contract or contracts.

Figure 2:
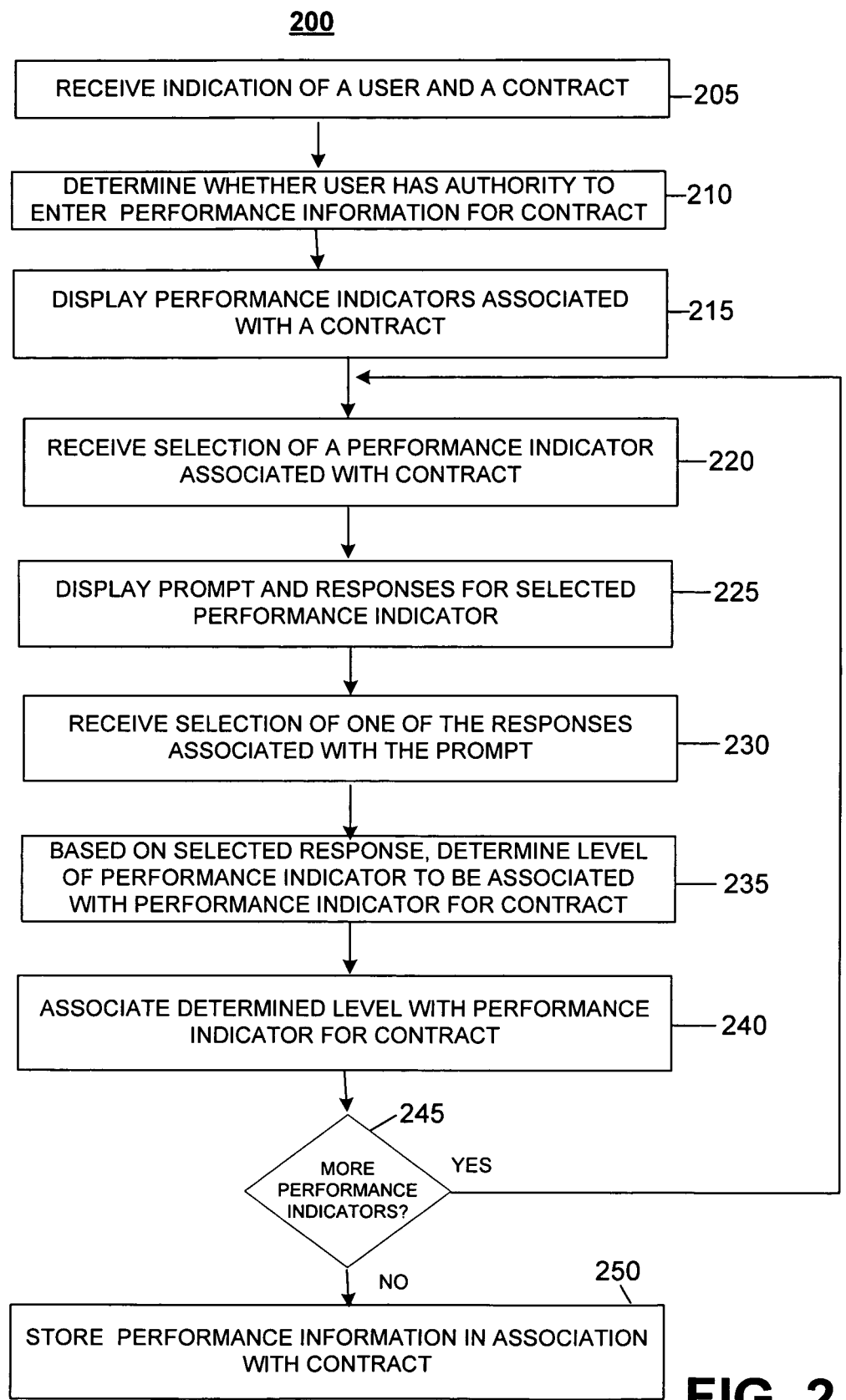
FIG. 2 is a flow chart of a process for entering or revising levels of performance for performance indicators for a contract.

FIG. 2 illustrates a process 200 for entering or revising a level of a performance for performance indicators for a contract. The process 200 may begin when a user seeks to enter or revise performance information for a contract, such as by activating the control 162 to update contract information in FIG. 1A or 1B. The process 200 is performed by a processor, such as a processor that generates the user interface 100A of FIG. 1A or user interface 100B of FIG. 1B.

The processor receives an indication of the user who initiated the process 200 and the contract for which performance information is to be entered or revised (step 205). The processor determines whether the user has authority to enter performance information for the contract (step 210). This may be accomplished, for example, by accessing a user profile for the identified user to determine the authority associated with the user. When the user does not have authority to update the performance information (step 210), the process 200 ends.

When the user has authority to update the performance information (step 210), the processor displays the performance indicators that are associated with the selected contract (step 215). For example, the processor may display the user interface 100B of FIG. 1B that presents, in heading information 185, the name of each performance indicator applicable to the contract. When a user enters new performance information for a month, instead of revising existing performance information, the current month row 115B may be presented without any symbols or with symbols representing default or proposed levels of performance. In contrast, when the user revises levels of performance for a month, the current month row 115B is populated with symbols representing the current level of performance for each performance indicator. In some implementations, the processor also displays previous levels of performance for the contract, as shown in row 182B of FIG. 1B. Alternatively or additionally, a list of the performance indicators may be presented and the user may select from that list.

The user selects a particular performance indicator, and the processor receives the selection (step 220). This selection may be accomplished, for example, by having the user select a performance indicator that is included on a list of performance indicators or by having the user use a pointing device to click-on or hover over the name of a performance indicator in heading 185 of FIG. 1B, or a symbol or symbol location presented in row 115B of FIG. 1B.

The processor determines and displays one or more prompts with associated responses from which the user may select performance-level elicitation (step 225). The displayed prompts and associated responses are associated with the selected performance indicator and are used by the processor to assign a corresponding level of performance based on the user's response or responses to the displayed prompts. Each prompt and the responses associated with that prompt may be referred to as a performance-level elicitation. When a particular performance indicator is selected, the user is presented with, and responds to, the prompts and response choices regardless of the particular contract for which levels of performance are being determined. This may be useful in providing a more standardized process that may, in turn, help to reduce variability in levels of performance entered by different users for the same or different contracts.

The user selects one of the multiple responses associated with a prompt and the processor receives the selection (step 230).

The processor uses the selected response to determine a level of performance indicator to be associated with the selected performance indicator (step 235). This may be accomplished, for example, based on a direct relationship between a selected response and a level of performance, such as when each one of multiple responses is associated with a particular level of performance. Additionally or alternatively, particular combinations of multiple selected responses for one or more prompts may correspond to a level of performance.

The processor associates the determined level with the performance indicator and the contract (step 240). Steps 220-240 are repeated until the user indicates that no additional performance indicators are to be selected (step 245).

The processor then stores each of the determined levels of performance in association with the contract and the performance indicator to which the determined level applies (step 250) and the process 200 ends.

In some implementations, a subset of the available performance indicators associated with a contract may be displayed and selectable by a user or may be displayed based on user authority to enter the subset of performance indicators for a particular contract or for multiple contracts. Still other implementations may automatically select a performance indicator and display the associated prompt and responses without requiring a user to select one of the performance indicators.

In some implementations, an automated process that does not require user input may be used to determine a level of performance for one or more performance indicators. This may be particularly useful when a level of performance is based on quantitative information. For example, the level of performance for an accounts receivable performance indicator may be based on the age of receivables for a contract relative to the contract payment terms or a supplier policy that applies to multiple contracts. A first level of performance may be associated when all receivables are current, a second level of performance may be associated when some receivables are overdue by a first number of days (such as 30 days), a third level of performance may be associated when some receivables are overdue by a second range of days (such as 31-60 days), and a fourth level of performance may be associated when some receivable are overdue by a third range of days (such as more than 60 days). In such a case, the level of performance for an accounts receivable performance indicator may be determined without requiring human intervention based on aging information for accounts receivable for a contract that may be, for example, obtained from a financial management system.

Figure 3A:
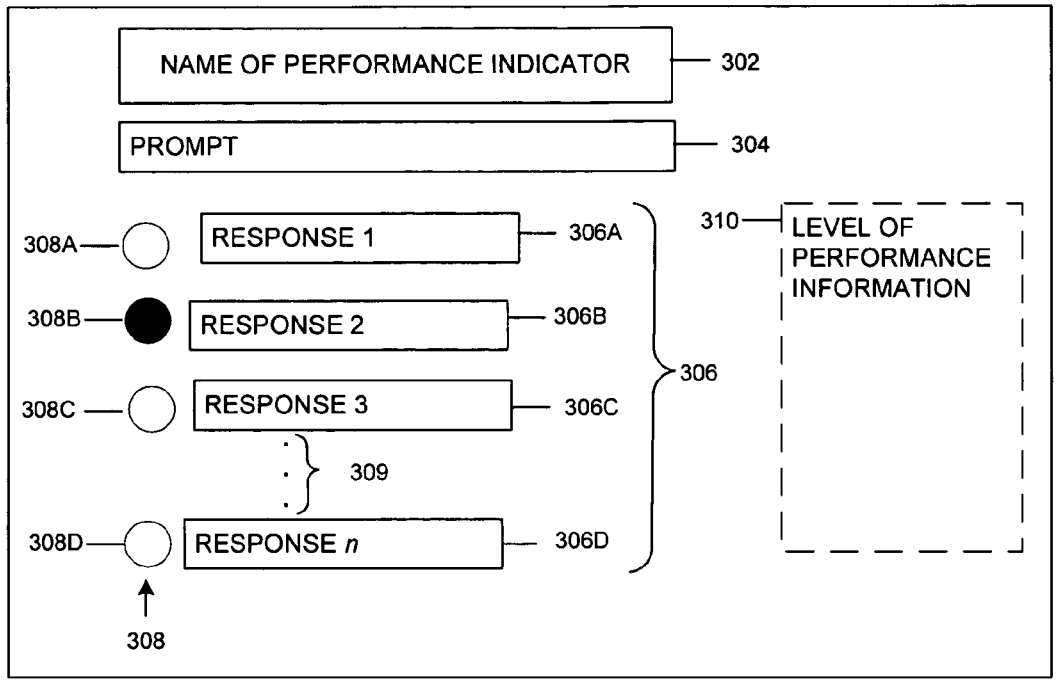

FIG. 3A provides an example of a user interface 300A for eliciting responses from a user to determine the level of performance for a performance indicator 302. The performance indicator may have been identified using the process 200 in FIG. 2, though a different process for identifying the performance indicator that is the focus of the user interface 300A also may have been used. The user interface 300A includes the name of the performance indicator 302, which may be one of the performance indicators presented in heading information 147 of FIG. 1. Alternatively or additionally, another type of identifier for a performance indicator may be presented. For example, a numeric or alphanumeric performance indicator identifier that uniquely identifies the performance indicator may be presented, as may a category to which the performance indicator belongs. Some implementations may display a definition of the performance indicator or provide additional information or an explanation about the performance indicator or the contract for which the level of performance is being determined. For example, some implementations may include an indication of the contract to which the response applies.

Figure 3B:
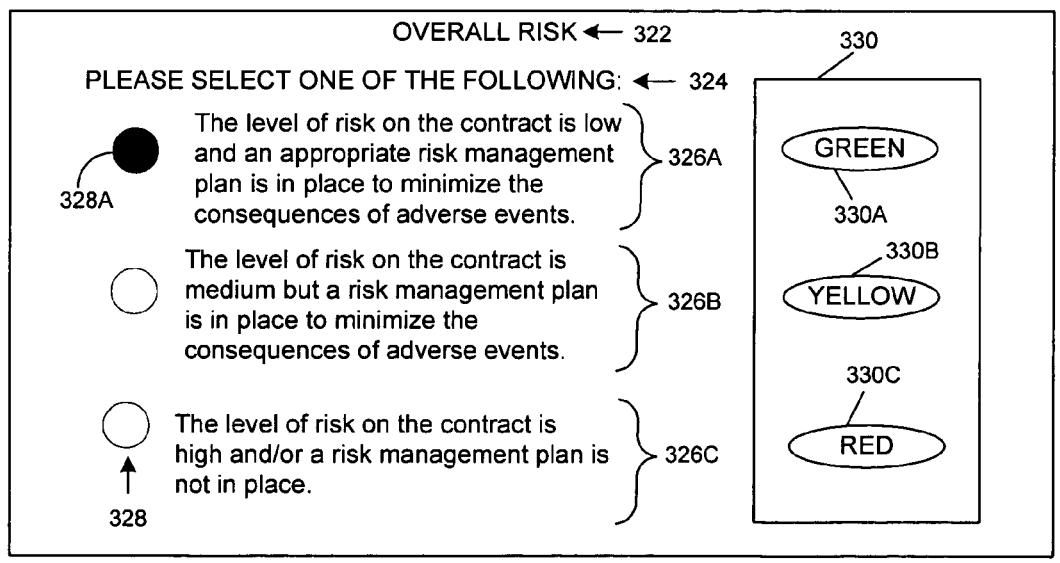
Figure 3D:
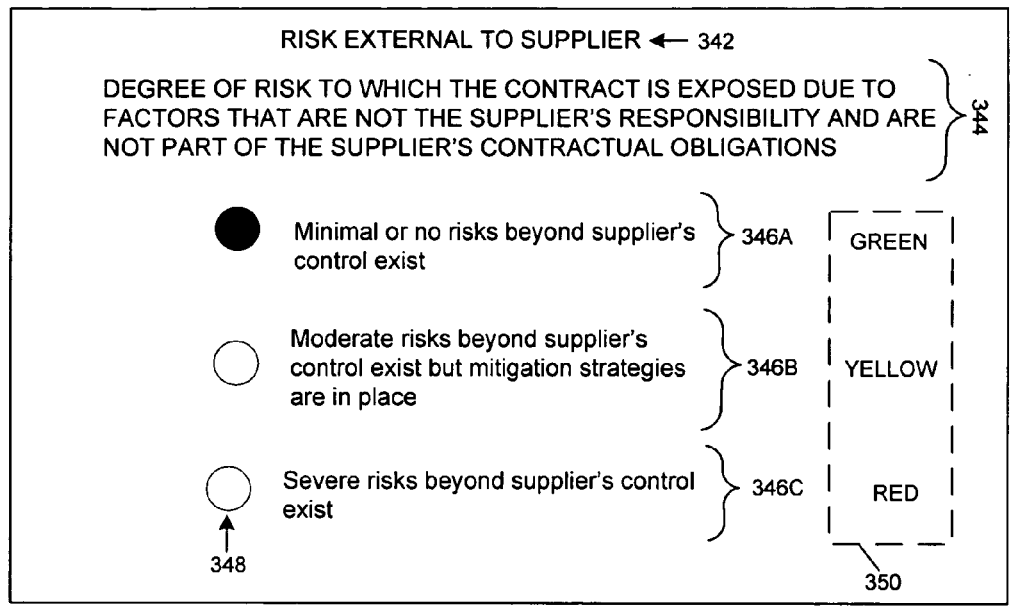

The user interface 300A also includes a prompt 304 to which the user responds by selecting one of the responses 306. The prompt 304 can be a question, statement or other type of prompt that is associated with multiple responses 306 from which a user selects using selection controls 308. In some implementations, the prompt may include a definition of the performance indicator, as shown in FIG. 3D.

The number of responses presented may vary based on the prompt 304, as shown by ellipsis 309. Each of the responses 306A, 306B, 306C or 306D is associated with a corresponding selection control 308A, 308B, 308C or 308D. A user selects a particular response by selecting a corresponding control. As illustrated, response 306B is selected, as shown by the selection control 308B.

In some implementations, information 310 about the manner for determining a level of performance also is presented. For example, a corresponding level of performance may be presented in association with each response—that is, a symbol representing a level of performance or another type of level indicator may be presented in association with each of the responses, as shown in FIGS. 3B and 3C. Alternatively or additionally, a text explanation or a rule may be displayed to describe the manner in which the level of performance is determined. This may be particularly useful when multiple selections of responses 306 to the prompt 304 are used to determine a particular level of performance for the performance indicator. Showing the manner of determining the level of performance may be particularly useful when responses to multiple prompts are used to determine a level of performance for the performance indicator 302.

Figure 3E:
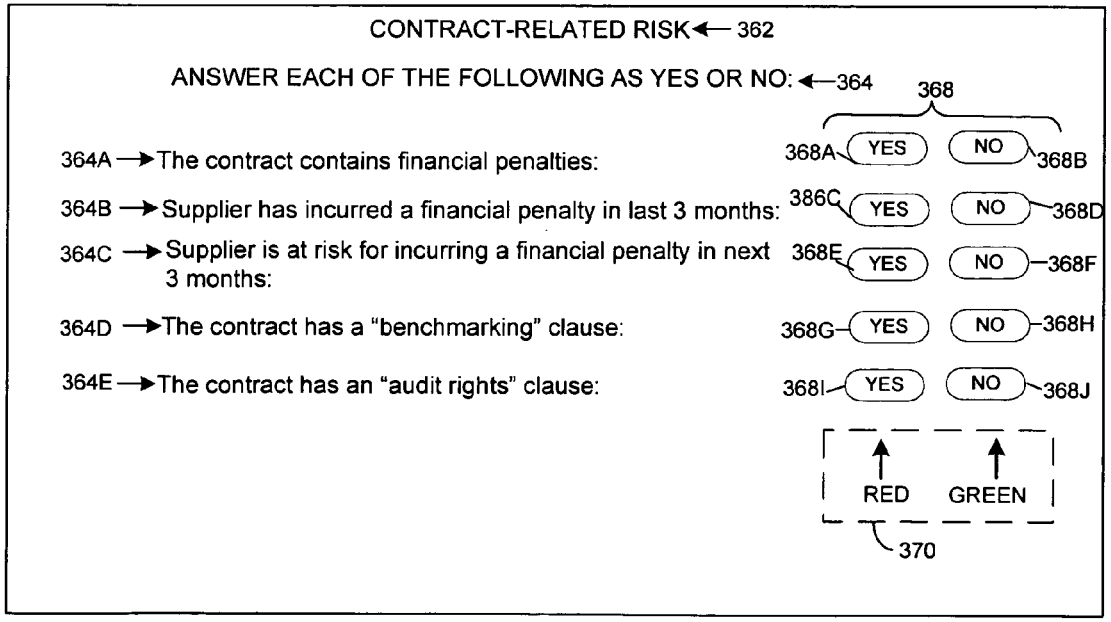

FIG. 3B shows an illustration of a user interface 300B for eliciting a user response to determine a level of performance for an overall risk indicator 322. The prompt 324 directs the user to "select one of the following" responses. The user interface 300B enables a user to select one of the responses 326A, 326B or 326C using one of the selection controls 328. As shown, the response 326A is selected, as indicated by selection control 328A. In the example of user interface 300B, the responses are mutually exclusive such that only one of the responses 326A, 326B or 326B may be selected. Responses need not necessarily be mutually exclusive as shown in the examples of FIGS. 3C and 3E.

In some implementations, a response may be a compound statement of which only one part needs to be true for the response to be selected. In particular, the response 326C is appropriate when either (1) "the level of risk on the contract is high" or (2) "a risk management plan is not in place." Thus, when the risk on the contract is low and a risk management plan is not in place, the selection 326C is to be selected. Similarly, when the risk on the contract is high, the selection 326C is to be selected regardless of whether a risk management plan is in place.

The information 330 associates a level of performance with each of the responses 326A, 326B and 326C. In particular, a green level 330A is associated with response 326A, a yellow level 330B is associated with response 326B, and a red level 330C is associated with response 326C. Thus, the level 330A (here, a level of performance indicated by the text "GREEN") is to be associated with the overall risk indicator 322 for the contract.

FIG. 3C depicts another example of a user interface 300C for eliciting a user response to determine a level of performance for an overall risk indicator 322. In contrast to the example of user interface 300B of FIG. 3B in which the responses are mutually exclusive and response 326C is a compound response, the user interface 300C permits multiple selections of responses 326A, 326B, 326C and 326D. For example, when the "level of risk on the contract is high" and a "risk management plan is not in place," responses 326E and 326F both may be selected.

The user interface 300C also shows that more than one response may result in the same level of performance being associated with the performance indicator for the contract. In particular, when either response 325E or response 325F is selected, the level of performance that corresponds to a "red" level is associated with the performance indicator for the contract, as indicated by levels 330C and 330D.

FIG. 3D shows an illustration of a user interface 300D for eliciting a user response to determine a level of performance for a risk indicator 342 for risk external to the supplier. The prompt 324 directs the user to indicate the "DEGREE OF RISK THAT THE OVERALL CONTRACT IS EXPOSED TO DUE TO FACTORS THAT ARE NOT THE SUPPLIER'S RESPONSIBILITY AND ARE NOT PART OF THE SUPPLIER'S CONTRACTUAL OBLIGATIONS." In this instance, the prompt 324 includes the definition of the risk indicator 342. The user interface 300D includes responses 346A, 346B and 346C, selection controls 348, and information 350 that portrays a level of performance that corresponds to each of responses 346A, 346B and 346C.

FIG. 3E depicts an example of a user interface 300E for eliciting a user response to determine a level of performance for a risk indicator 362 for contract-related risk to the supplier. In general, the user interface 300E enables a user to choose one of two selections for each of multiple responses. The prompt 364 directs the user to "ANSWER EACH OF THE FOLLOWING QUESTIONS YES OR NO." The user interface 300E includes responses 364A-364E, selection controls 368 and information 370 that relates to the manner that the elicited selections 368 of the responses 364A-364E are used to determine a level of performance for the contract-related risk indicator 362. As two examples, selections 368A ("YES") and 368B ("NO") are associated with response 364A ("The contract contains financial penalties:"), and selections 368C ("YES") and 368D ("NO") are associated with response 364B ("Supplier has incurred a financial penalty in the last three months:").

A level of performance is associated with the contract-related risk indicator 362 for the contract based on one or more of the user's selections to the responses 364A-364E. In some implementations, for example, the selection of one of the "YES" selections, such as 368A, 368C, 368E, 368G or 368I, results in a level of performance corresponding to "RED" being associated with the contract-related risk indicator 362. Alternatively, combinations of selections may be used to determine a level of performance to associate with the contract-related risk indicator 362. For example, when selection 368G ("YES") to response 364D ("The contract has a 'benchmarking' clause") and selection 368I ("YES") to response 364E ("The contract has an 'audit rights' clause"), the level of performance corresponding to "RED" is associated. In yet another example, a level of performance may be associated with the contract-related risk indicator 362 based on the selection of a particular response. A level of performance that corresponds to "RED" is associated when a user selects selection 368E ("YES") of response 364C ("Supplier is at risk for incurring a financial penalty in next 3 months"), regardless of the selections made by the user for the responses 364A, 364B, 364D, and 364E.

Figure 3F:
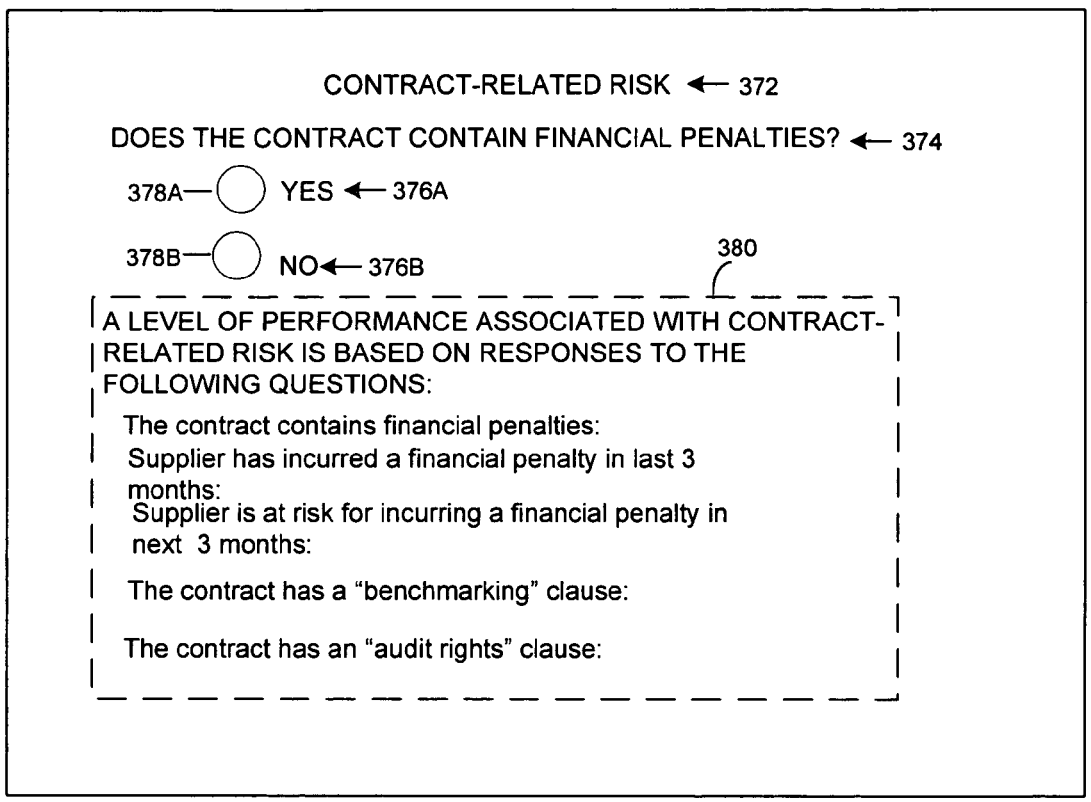
Figure 3G:
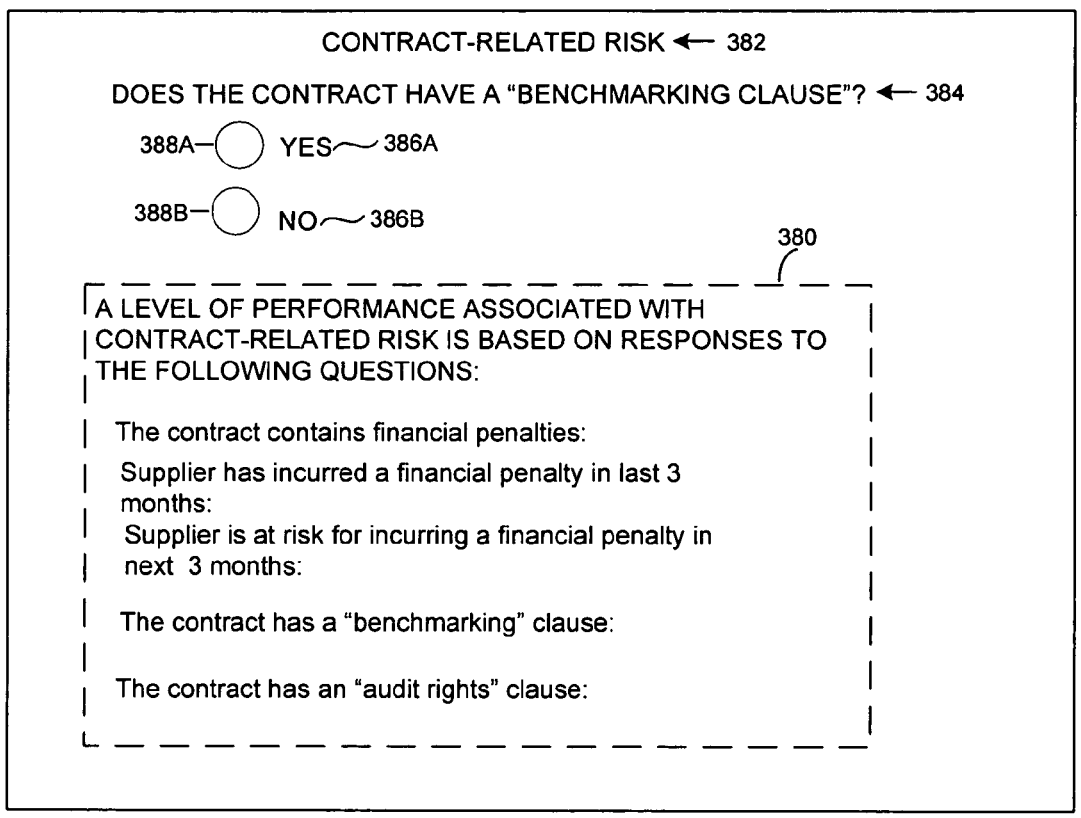

As shown in FIGS. 3F and 3G, each of the responses 364A-364E of FIG. 3E may be presented as a prompt with responses corresponding to "YES" and "NO" from which the user selects. In particular, FIG. 3F shows a user interface 300F for eliciting a user response to determine a level of performance for a risk indicator 372 for contract-related risk to the supplier. The user interface 300F includes a performance indicator name 372, a prompt 374, responses 376A and 376B, and selections 378A and 378B, each of which corresponds to a respective response 376A or 376B. The prompt 374 corresponds to response 364A in FIG. 3E and responses 376A and 376B correspond to the selections 368A and 368B for response 364A in FIG. 3E. The user interface 300F also includes information 380 that indicates the manner in which the contract-related risk indicator 372 is determined. In this case, the information 380 identifies a series of questions that are used to determine a level of performance for the risk indicator 372. Each of the questions may be presented as a separate prompt, as illustrated by FIGS. 3F and 3G. This illustrates the use of responses to multiple prompts to determine a level of performance for a performance indicator.

Similarly, FIG. 3G shows a user interface 300G for eliciting a user response to determine a level of performance for a risk indicator 382 for contract-related risk to the supplier. The user interface 300G includes a performance indicator name 382, a prompt 384, responses 386A and 386B and selections 388A and 388B, each of which corresponds to a response 386A or 386B, respectively. The prompt 384 corresponds to response 364D in FIG. 3E and responses 386A and 388B correspond to the selections 368G and 368H for response 364D in FIG. 3E.

Figure 4:
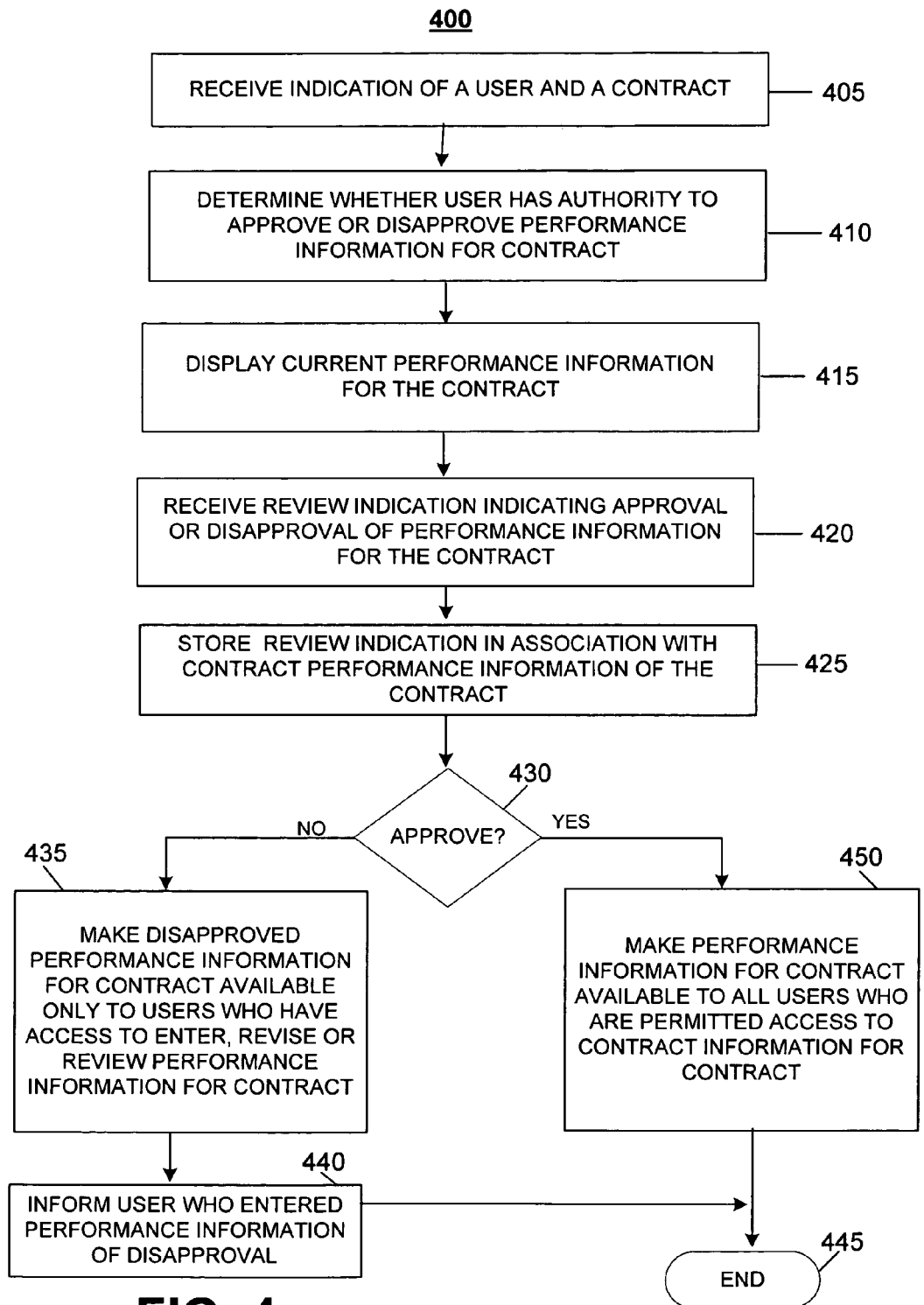
FIG. 4 is a flow chart for a process for reviewing performance information.

FIG. 4 illustrates a process 400 for reviewing the levels of performance for performance indicators associated with a contract. The process 400 is performed by a processor, such as a processor that generates the user interface 100A of FIG. 1A or the user interface 100B of FIG. 1B.

The process 400 may begin when a user seeks to approve or disapprove performance information for a contract. The processor receives an indication of the user who initiated the process 400 and the contract for which performance information is to be reviewed for approval (step 405). The processor determines whether the user has authority to approve the performance information for the contract (step 410). This may be accomplished, for example, in a manner similar to that of step 210 of FIG. 2. When the user does not have authority to approve the performance information (step 410), the process 400 ends.

When the user has authority to approve the performance information (step 410), the processor displays current performance information for the contract (step 415). The processor may display the performance information related to the contract in a performance summary window on a user interface, such as window 100B of FIG. 1B.

The user reviews the performance information for the contract and enters a review indication (which may indicate that the user approves the performance information or may indicate that the user disapproves the performance information), and the processor receives the review indication (step 420). The processor stores the review indication in association with the performance information for the contract (step 425). Some implementations also may store additional review process information, such as the user who reviewed the performance information, the date on which the performance information occurred, and a comment entered by the user.

When the review indication indicates that the user disapproved the performance information (step 430), the processor only permits a user who is authorized to enter, revise or review performance information for the contract to view the performance information (step 435). The processor also sends a message and/or route the contract information to the user who entered the performance information to inform the user of the disapproval (step 440). The process ends (step 445). The user who entered the performance information then revises the performance information, such as by using the process 200 of FIG. 2. The revised performance information is subsequently reviewed, such as by using the process 400.

When the review indication indicates that the user approved the performance information (step 430), the processor makes the performance information available for viewing by users who are permitted to access contract information for the contract but are not authorized to enter, revise or review performance information for the contract (step 450). The process then ends (step 445).

Figure 5:
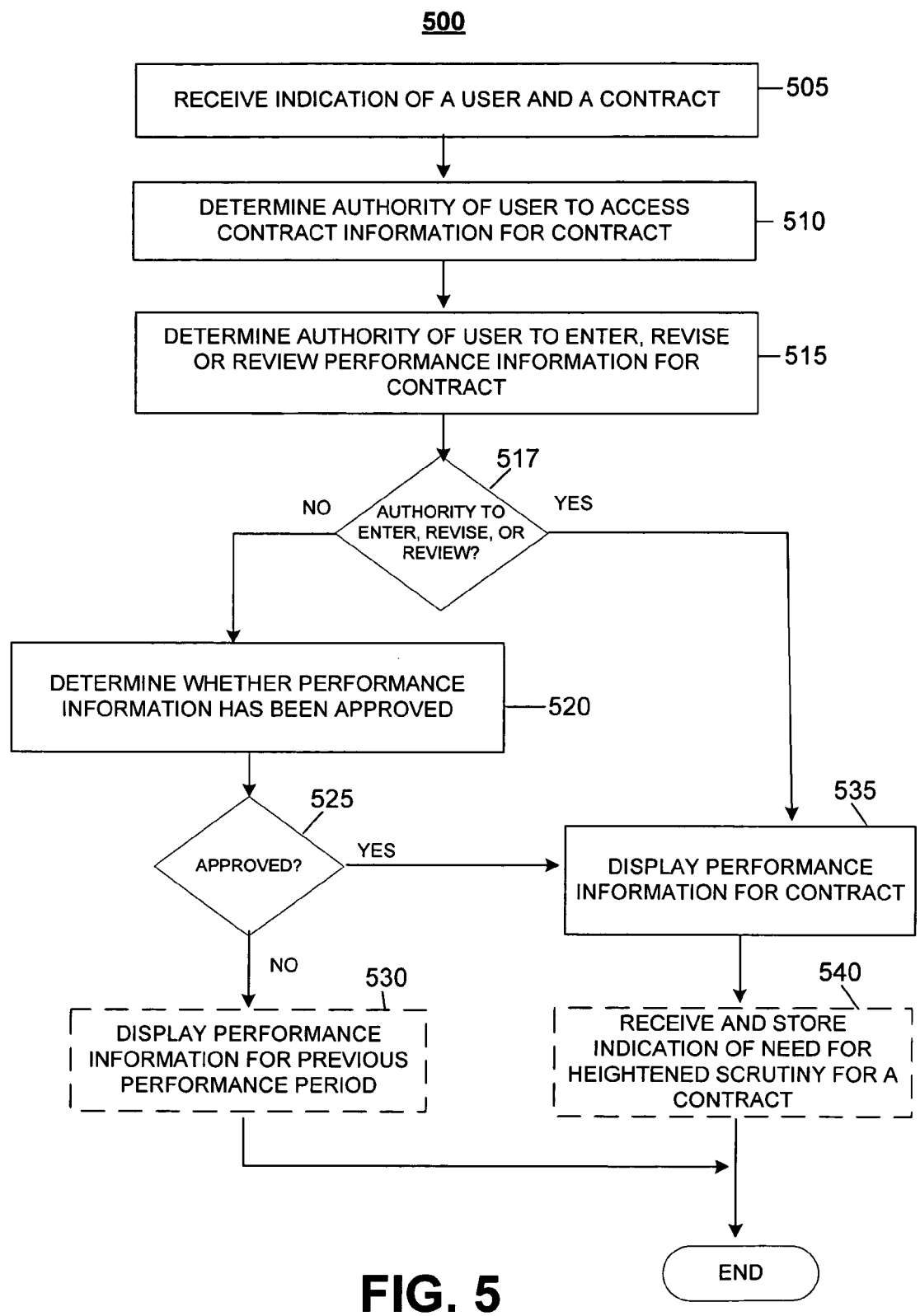
FIG. 5 is a flow chart for a process for displaying to a user performance information for a contract.

FIG. 5 illustrates a process 500 for displaying performance information for a contract to a user. The process 500 is performed by a processor, such as a processor that generates the user interface 100A in FIG. 1A or the user interface 100B in FIG. 1B and/or performs the process 200 of FIG. 2 or the process 400 of FIG. 4.

The process 400 may begin when a user seeks to view performance information for a contract. The processor receives an indication of the user who initiated the process 400 and the contract for which performance information is to be reviewed for approval (step 505). The processor determines whether the user has authority to access contract information for the contract (step 510). This may be accomplished, for example, in a manner similar to that of step 210 of FIG. 2. When the user does not have authority to access contract information for the contract in any manner (step 510), the process 500 ends.

The processor determines whether the user has authority to view, enter, revise and/or review performance information for the contract (step 515).

When the user does not have authority to enter, revise and/or review performance information for the contract (step 517), the processor determines whether the performance information has been approved (step 520). When the performance information has not been approved (step 525), the processor does not allow the user to view the unapproved performance information for the contract and, optionally, displays performance information for a previous performance period (step 530).

When the user does have authority to enter, revise and/or review performance information for the contract (step 517), or when the performance information has been approved (step 525), the processor displays the performance information for the contract (step 535).

Some implementations may permit a user to indicate a need for heightened scrutiny for the contract, and, if so, the processor receives an indication of the need for heightened scrutiny and stores the indication with the contract information for the contract (step 540). The ability to indicate a need for heightened scrutiny may be limited a particular user, such as a risk manager who is responsible for managing risk of the supplier.

Figure 6B:
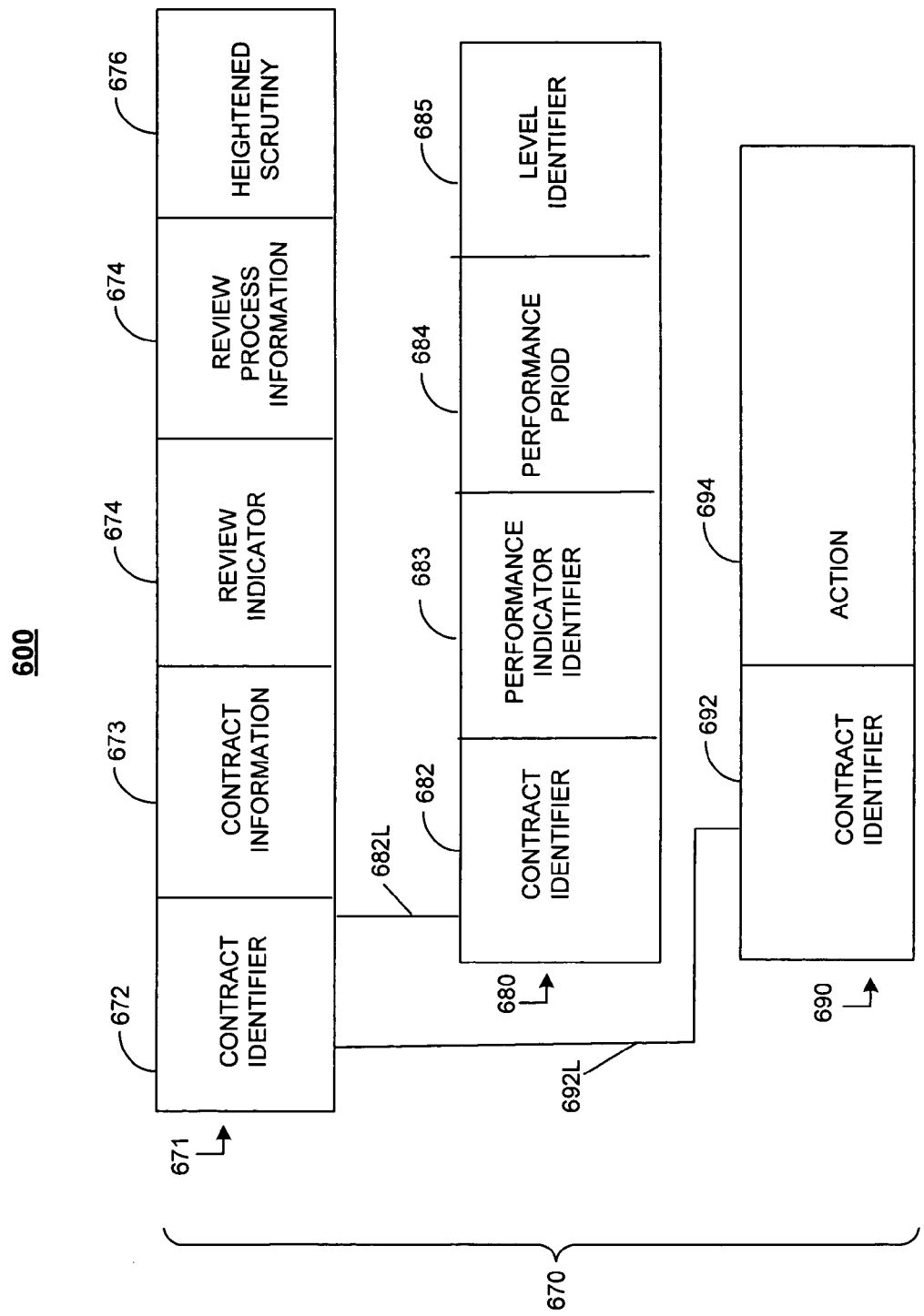

FIGS. 6A and 6B illustrate example data structures 600 for use in monitoring performance of service contracts. As shown in FIG. 6A, the data structures 600 include reference information 610 for performance indicators. The reference information 610 includes a data structure 620 for a performance indicator that includes a performance indicator identifier 622 that uniquely identifies a performance indicator, a name 623, an optional description 624, an optional category 625 to which the performance indicator belongs, a method 626 for determining a level of performance for the performance indicator, and an optional elicitation identifier 627 for use in identifying a prompt and responses to elicit from a user information related to the performance indicator. The method 626 for determining a level of performance for the performance indicator may identify a computer program, a method, a script or other instructions for transforming information about the contract to a level of performance for the performance indicator identified by the performance indicator identifier 622. Alternatively or additionally, the method 626 may indicate a predefined formula for determining a level of performance based on an attribute or attributes associated with the contract. For example, the method 626 may include multiple ranges of account receivable amounts and, for each range, an associated level of performance for an accounts receivable performance indicator.

The reference information 610 also includes a data structure 630 for elicitation information for use to elicit from a user information related to the performance indicator. The elicitation information 630 includes heading information 640 that includes an elicitation identifier 642 that uniquely identifies each elicitation in elicitation information 630, a performance indicator identifier 644 that identifies the performance indicator to which the elicitation information is related, a prompt 646 that identifies the prompt text displayed for the elicitation, and optional information 648 related to the manner of determining the level of performance based on the responses to the elicitation.

The elicitation information 630 also includes response information 650 that identifies one of multiple responses for the corresponding elicitation heading information 640. The response information 650 includes a response identifier 652 that uniquely identifies a response for the elicitation and an elicitation identifier 654 that identifies a particular elicitation heading of elicitation heading information 640 for which the response is displayed. The response information 650 also includes the text 656 to be displayed for the response and, optionally, a level identifier 658 for the level of performance associated with the response identified by the response identifier 652.

The data structures 620 and 630 are related through the use of the performance indicator identifiers 622 and 644, respectively, that associates information in the data structures 620 and 630, as shown by link 622L. The data structures 620 and 630 also are related through the use of the elicitation identifiers 627 and 642, respectively, as shown by link 627L.

The data structures 640 and 650 are related through the use of the elicitation identifiers 642 and 654, respectively, that associate information in the data structures 640 and 650, as shown by link 642L.

The reference information 610 also includes level information 660 that includes multiple entries that each describe a level of performance. The level information 660 includes a level identifier 662 that uniquely identifies each level, an optional symbol 663 to be used to represent the level, optional text 664 to be used to represent the level, an optional rank 665 of the level, and an optional set identifier 666 for use in grouping levels. In one example, a set of performance levels includes the information presented in Table 1 below.

TABLE 1

| Level Identifier | Symbol | Text | Rank | Set Identifier |
|---|---|---|---|---|
| Lev01 | Circle with green center | Satisfactory | 3 | Set01 |
| Lev02 | Square with yellow center | Watch | 2 | Set01 |
| Lev03 | Triangle with red center | Critical | 1 | Set01 |

In another example, a set of performance levels includes the information presented in Table 2 below.

TABLE 2

| Level Identifier | Symbol | Text | Rank | Set Identifier |
|---|---|---|---|---|
| Lev04 | Green checkmark | No problem | 2 | Set02 |
| Lev05 | Red X | Critical | 1 | Set02 |

The data structures 650 and 660 are related through the use of the level identifiers 658 and 662, respectively, that associate information in the data structures 650 and 660, as shown by link 658L.

The data structures 600 also include a data structure 670 for contract performance information that includes contract heading information 671, a data structure 680 for contract performance indicator information, and a data structure 690 for contract action information. The contract heading information 671 includes a contract identifier 672 that uniquely identifies each contract.

The contract heading information 671 also includes contract information 673 that may be, for example, contact information 176 of FIG. 1B or contract overview information 178 of FIG. 1B. The contract information 673 also may include other types of contract information that may be received from another system. For example, contact information 673 may include contract terms and conditions, customer survey information, and accounts receivable information received from a financial management system.

The contract heading information 671 also includes a review indicator 674 that indicates whether the review status of the performance information for the current performance period, such as whether the status of performance information is approved, disapproved or not reviewed. The contract heading information 671 also includes review process information 675, such as was described previously with respect to FIG. 1B. The contract heading information 671 also may include a heightened-scrutiny indicator 676 that identifies a contract that is in need of heightened scrutiny.

The contract performance indicator information 680 includes a contract identifier 682 that identifies the contract to which the action information applies and a performance indicator identifier 683 that identifies a particular performance indicator, a performance period 684, and a level 685 of performance associated with the performance indicator identified by the performance indicator identifier 683 for the performance period identified by the performance period 684.

The contract action information 690 includes a contract identifier 692 that identifies the contract to which the action information applies and a description 694 of actions needed or taken that are associated with the contract. For example, the description 694 may identify an action needed to mitigate one or more risks associated with the contract.

The data structures 671, 680 and 690 are related through the use of the contract identifiers 672, 682, and 692, respectively, that associate information in the data structures 671, 680 and 690, as shown by links 682L and 692L. The data structure 680 is also related to the data structure 620 through the use of the performance indicator identifiers 683 and 622, respectively. The data structure 680 is also related to the data structure 660 through the use of the level identifiers 685 and 662, respectively.

Figure 7:
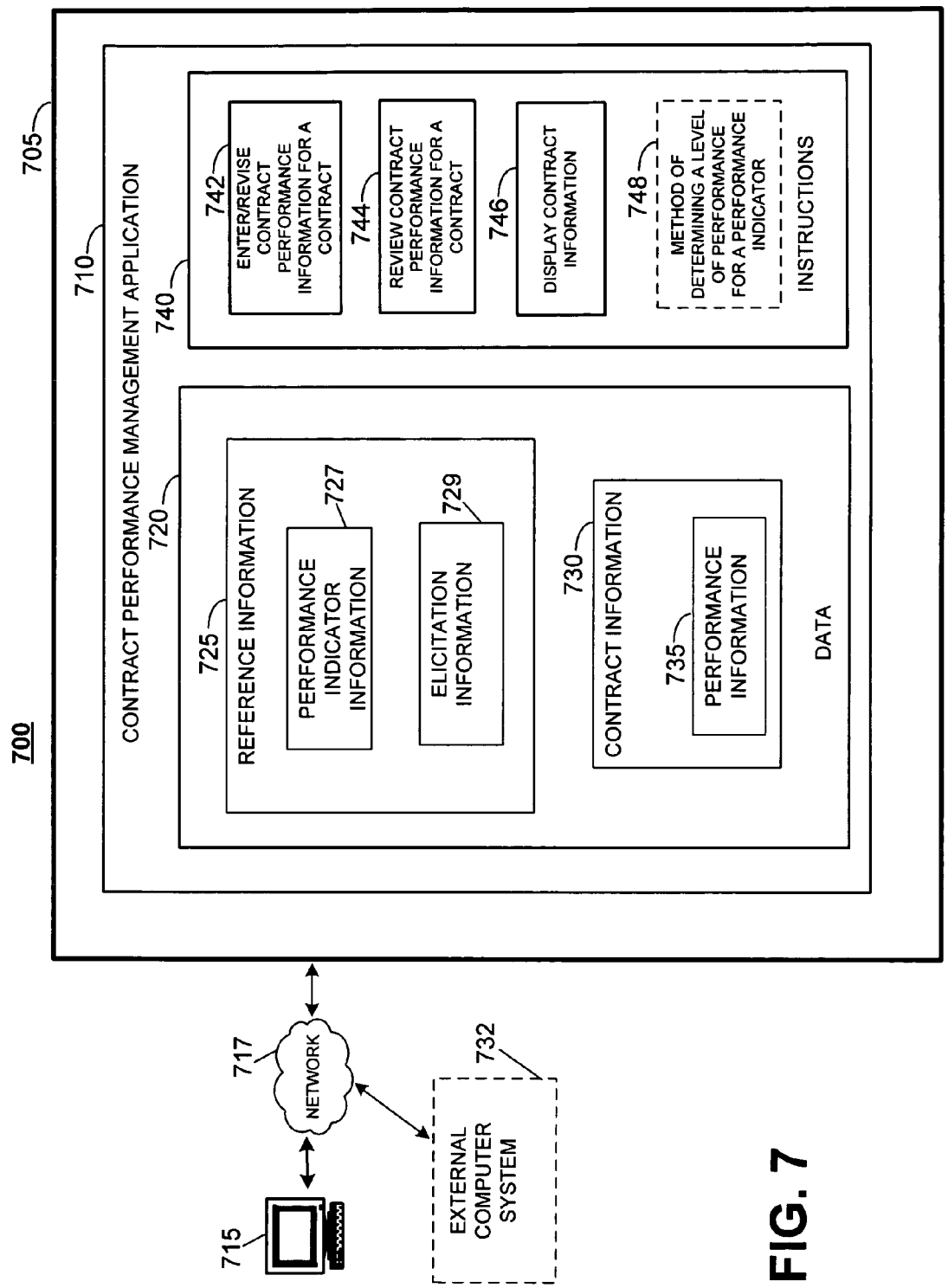
FIG. 7 is a block diagram of a system for monitoring the performance of service contracts.

FIG. 7 shows a system 700 for monitoring the performance of service contracts. The system 700 includes a computer system 705 that is capable of executing a contract performance management application 710 for creating, revising, reviewing and displaying performance information for service contracts. A computer 715 used by a user of the contract performance management application 710 is able to access contract performance management application 710 through a network 717. The network 717 may be one of a variety of established networks, such as, for example, a local area network (LAN), a wide-area network (WAN), the Internet, the world wide web (WWW), or another type of a wired or wireless network.

Contract performance management application 710 includes data 740 having reference information 725 and contract information 730. The reference information 725 includes performance indicator information 727. Each entry in performance indicator information 727 corresponds to a performance indicator used to monitor performance of service contracts. Examples of entries include, for example, a database record, one or more related rows in data tables in a database, or an object instance in an object-oriented database. An entry in performance indicator information 727 may use, for example, the data structure 620 of FIG. 6A.

The reference information 725 also includes elicitation information 729. Each entry in elicitation information 729 corresponds to a prompt and multiple responses selectable by a user for determining a level of performance for a performance indicator. An entry in elicitation information 729 may use, for example, the data structure 630 of FIG. 6A.

The contract information 730 includes an entry for each contract for which performance is monitored. A customer of the supplier may have multiple contracts. An entry of contract information 730 includes information about the contract, such as described previously with respect to FIG. 1B and FIG. 6B. The contract information may include information received from the external computer system 732 through the network 717. An entry in contract information 730 may use, for example, the data structure 670 of FIG. 6B.

The contract information 730 also includes performance information 735 that includes an entry for each performance indicator used to monitor the performance of a service contract. Each entry in performance information 735 may use, for example, the data structure 670 of FIG. 6B.

The contract performance management application 710 also includes instructions 740 that are executed by a processor or processors of the computer system 705 and operate on the data 720. The instructions include a process 742 to enter or revise contract performance information for a contract entry in contract information 730. One example of the process 742 is the process 200 of FIG. 2.

The instructions 740 also include a process 744 to review contract performance information for a contract entry in contract information 730. The process 744 is used to enter an indication as to whether levels of performance entered for a contract are approved or disapproved. One example of the process 744 is the process 400 of FIG. 4.

The instructions 740 also include a process 746 to display contract information. The process 746 may display performance information for multiple contracts, though this need not necessarily be so. In one example, the process 746 may display a performance summary window 110 of FIG. 1 in which performance information and process review information for multiple contracts are presented in a series of rows. The process 746 also may display information for a particular contract, as shown in FIG. 1B. One example of the process 746 is the process 500 of FIG. 5.

The instructions 740 also include one or more methods 748 to determine a level of performance of a performance indicator. The method 748 may include instructions for presenting an entry of elicitation information 729 for a performance indicator, receiving a response to a prompt from a user, and determining a level of performance for the performance indicator based on the response received. Carrying out a method 748 using elicitation information 729 may be particularly useful when a level of performance for a performance indicator is based on qualitative information. The method 748 also may include instructions for receiving contract data from the external computer system 732, storing the received data, and determining a level of performance for one or more performance indicator entries for a contract or contracts. The use of a method 748 that receives contract information from an external computer system and determines a level of performance based on the received contract information may be particularly useful when a level of performance for a performance indicator is based on quantitative information.

One area whether the techniques and concepts may find specific applicability is in a cyclical process for monitoring contract delivery for an IT services contract from the perspective of the supplier of the services, particularly a context in which many contracts, perhaps hundreds (or even thousands) of contracts, are in place to provide services to different customers. In one example of a cyclical monitoring process, the delivery manager for a contract may enter performance information for a performance period for a contract. In one example, the delivery manager may be presented with performance information for a previous performance period to help the delivery manager in entering performance information for the current performance period, for example, as shown by user interface 100B of FIG. 1B. In another example, the delivery manager may be presented with a default or proposed level of performance for some or all performance indicators for the contract. The default level of performance may be set based on the level of performance for the performance indicator in a previous performance period. Additionally or alternatively, the default level of performance, particularly for quantitative performance indicators, may be set automatically without human manipulation based on contract information, such as the amount and/or age of accounts receivable for the contract.

An account executive then may review the performance information for the contracts for which the account executive is responsible. In some cases, the account executive identifies a contract as being in need of heightened scrutiny. When disapproved, the delivery manager revises the performance information, which is subsequently reviewed by the account executive. When approved, the performance information for a contract is made available for viewing by other users, including a contract review committee.

A contract review committee then reviews a subset of the contracts for which a need of heightened scrutiny has been indicated. The committee may identify actions to reduce risk or correct problems associated with a contract. The committee also may identify some of the contracts for presentation to the chief executive officer, the chief financial officer, the chief operating officer, or some other type of high-level business executive for the supplier.

The cyclical review process may include other levels of review, such as review by a risk manager or another type of user who has expertise in managing risk or contract quality management.

The use of a cyclical review process in which each contract is reviewed on a periodic basis, such as a month or a quarter, may be useful. For example, potential problems may be identified and actions may be taken to mitigate risk or correct minor problems before the risk, problem or issue escalates into a major issue, such as the threat of cancellation of a contract by the customer (or actual loss of the contract) or financial losses on a contract.

The techniques and concepts have been described using service contracts and, in particular, contracts for information technology services. Other types of contracts, including contracts for the delivery of products, also may be monitored using these techniques and concepts.

The user interfaces are described as having windows for which a user may control the display position of each window on a display device. A user's control over the display position of a window may include, for example, indirect or direct control of the coordinates of the display device at which the window is positioned, the size of the window, and the shape of the window. Alternatively, any of the windows described herein may be implemented as a pane of a graphical user interface in which the pane is displayed in a fixed position on a display device.

The techniques can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in various forms of programming languages, including compiled or interpreted languages, and it can be deployed in various forms, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques can be performed by one or more programmable processors executing a computer program to perform functions of the techniques by operating on input data and generating output. Method steps can also be performed by, and apparatus of the techniques can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and various of one or more processors of various kinds of digital computer. Generally, a processor will receive instructions and data from a read-only memory or a random access memory or both. A computer includes a processor for executing instructions and one or more memory devices for storing instructions and data. Generally, a computer will also include, or be operatively coupled to receive data from or transfer data to, or both, one or more mass storage devices for storing data, such as, magnetic, magneto-optical disks, or optical disks. Information carriers suitable for embodying computer program instructions and data include all forms of non-volatile memory, including by way of example semiconductor memory devices, such as, EPROM, EEPROM, and flash memory devices; magnetic disks, such as, internal hard disks or removable disks; magneto-optical disks; and CD-ROM and DVD-ROM disks. The processor and the memory can be supplemented by, or incorporated in special purpose logic circuitry.

A number of implementations of the techniques have been described. Nevertheless, it will be understood that various modifications may be made. Accordingly, other implementations are within the scope of the following claims.

What is claimed is:

1. A article comprising a machine-readable medium storing instructions for causing data processing apparatus to:
generate a graphical user interface on a display device for using a computer to monitor performance of at least one contract for services wherein each contract for services includes a plurality of attributes including service performance attributes and financial attributes;
wherein the graphical user interface comprises a summary display for monitoring performance each contract for services, the summary display including a table that relates contracts for services to the attributes as performance indicators arranged into plurality of attribute sets including a first attribute set of a plurality of performance indicators related to service performance attributes, a second attribute set of a plurality of performance indicators related to financial performance attributes;
wherein the service performance attributes includes an objective component related to contract performance and a subjective component related to user satisfaction;
wherein each performance indicator included on the table is represented with at least one of a set of performance level indicia symbols that each represent a different level of performance, wherein the set of performance level indicia symbols is selected from a group of a plurality of user-selectable sets of performance level indicia symbols; and
wherein each displayed symbol represents a level of performance for a corresponding performance indicator and a corresponding contract;
receive updated symbols entered by a first type of user, wherein the updated symbols represent revised levels of performance for performance indicators associated with a particular contract for a period of time;
display, for a second type of user, the updated symbols representing revised levels of performance for performance indicators associated with the particular contract;
receive, from the second type of user, either an approval indication or disapproval indication of the revised levels of performance for performance indicators associated with the particular contract;
display, for a third type of user, the updated symbols representing revised levels of performance for performance indicators associated with the particular contract in response to the approval indication; and
display, for the first type of user and the second type of user but not for the third type of user, the updated symbols representing revised levels of performance for performance indicators associated with the particular contract in response to the disapproval indication.

2. The article of claim 1 wherein at least one contract provides services to a different recipient than a recipient to whom services are provided by another contract.

3. The article of claim 1 the instructions for causing data processing apparatus to prompt a user to update symbols representing levels of performance for performance indicators associated with a particular contract.

4. The article of claim 1 instructions for causing data processing apparatus to display, for the third type of user, symbols representing levels of performance for performance indicators associated with the particular contract and applying to a second period of time wherein the second period of time occurs before to the period of time that applies to the updated symbols when the approval indication has not been received.

5. The article of claim 1 instructions for causing data processing apparatus to display a performance-level elicitation comprising a statement and multiple responses selectable by a user and associated with a performance indicator;
receive one of the multiple responses selected by the user and associated with a particular contract;
determine a level of performance for the performance indicator based on the received response;
associate the level of performance with the performance indicator for the particular contract; and
display a symbol associated with the level of performance for the performance indicator when symbols for the particular contract are displayed.

6. The article of claim 1 wherein the summary display includes one or more performance indicators that comprise financial indicators that relate to financial performance of a contract.

7. The article of claim 1 wherein the summary display includes one or more performance indicators that comprise risk indicators that relate to identification of a potential contract issue.

8. The article of claim 1 wherein the summary display includes one or more performance indicators that comprise quality indicators that relate to quality of service provided to the recipient of the contract.

9. The article of claim 1 wherein the summary display includes one or more performance indicators that comprise resource indicators that relate to resources needed to provide services to the contract recipient.

10. The article of claim 1 wherein the summary display includes one or more performance indicators that comprise scope indicators that indicate extent of non-contractual services provided to the recipient of the contract.

11. The article of claim 1 wherein the summary display further comprises information indicating an action item to be performed to improve contract performance for an associated contract.

12. The article of claim 1 wherein the graphical user interface further comprises a selection window having selection criteria modifiable by a user and operable to determine contracts displayed in the summary display.

13. The article of claim 1 wherein the graphical user interface further comprises a contract display including a contract description and performance information for a particular contract.

14. The article of claim 13 wherein the contract display includes performance information for a particular performance period for a particular contract.

15. The article of claim 13 wherein the contract display includes performance information for multiple particular performance periods for a particular contract.

16. The article of claim 13 wherein the contract display includes contract information related to one or more of service excellence, risk, financial performance, performance monitoring communication, and actions to mitigate risk or correct problems.

17. A computer-implemented method for presenting a graphical user interface on a display device of a computer having a processor coupled to a memory, the method comprising;

receiving into the memory performance data related to a plurality of attributes of a service performance of at least one contract for services wherein each contract for services includes a plurality of attributes including service performance attributes and financial attributes;

generating, with the processor, a graphical user interface that displays a summary display for monitoring contract performance for each contract for services from the received performance data, wherein:

the summary display includes a table that relates each contract for services to the plurality of attributes as performance indicators arranged into plurality of attribute sets including a first attribute set of a plurality of performance indicators related to service performance attributes, a second attribute set of a plurality of performance indicators related to financial performance attributes;

the service performance attributes includes an objective component related to contract performance and a subjective component related to user satisfaction;

each performance indicator included on the table is represented with at least one of a set of performance level indicia symbols that each represent a different level of performance;

the set of performance level indicia symbols is selected from a group of a plurality of user-selectable sets of performance level indicia symbols; and each displayed symbol represents a level of performance for a corresponding performance indicator and a corresponding contract;

receiving updated symbols entered by a first type of user and representing revised levels of performance for performance indicators associated with a particular contract and applying to a period of time;

displaying to a second type of user the updated symbols representing revised levels of performance for performance indicators associated with the particular contract;

receiving, from the second type of user, either an approval indication or disapproval indication of the revised levels of performance for performance indicators associated with the particular contract;

displaying, for a third type of user, the updated symbols representing revised levels of performance for performance indicators associated with the particular contract in response to the approval indication; and displaying to the first type of user and the second type of user but not for the third type of user, the updated symbols representing revised levels of performance for performance indicators associated with the particular contract and applying to a period of time.

18. The computer-implemented method of claim 17 wherein at least one contract provides services to a different recipient than a recipient to whom services are provided by another contract.

19. The computer-implemented method of claim 17 further comprising displaying a message to prompt a user to update symbols representing levels of performance for performance indicators associated with a particular contract.

20. The computer-implemented method of claim 17 further comprising displaying, for the third type of user, symbols representing levels of performance for performance indicators associated with the particular contract and applying to a second period of time, wherein the second period of time occurs before to the period of time that applies to the updated symbols when the approval indication has not been received.

21. The computer-implemented method of claim 17 further comprising:

displaying a performance-level elicitation comprising a statement and multiple responses selectable by a user and associated with a performance indicator;

receiving one of the multiple responses selected by the user and associated with a particular contract;

determining a level of performance for the performance indicator based on the received response;

associating the level of performance with the performance indicator for the particular contract; and displaying a symbol associated with the level of performance for the performance indicator when symbols for the particular contract are displayed.

22. The article of claim 1 wherein one of the sets of performance level indicia symbols includes a plurality of different geometric shapes.

\* \* \* \* \*

UNITED STATES PATENT AND TRADEMARK OFFICE
CERTIFICATE OF CORRECTION

PATENT NO. : 8,533,027 B1
APPLICATION NO. : 10/902256
DATED : September 10, 2013
INVENTOR(S) : Paul Wakely et al.

It is certified that error appears in the above-identified patent and that said Letters Patent is hereby corrected as shown below:

On the Title Page, Item (54), and in the Specification, column 1, line 2, Title, delete "DISAPPOVAL" and insert -- DISAPPROVAL --, therefor.

Signed and Sealed this
Fifth Day of November, 2013

Teresa Stanek Rea
*Deputy Director of the United States Patent and Trademark Office*